(12) United States Patent
Katagiri et al.

(10) Patent No.: US 7,843,493 B2
(45) Date of Patent: Nov. 30, 2010

(54) IMAGE SENSING APPARATUS AND IMAGE PROCESSING METHOD

(75) Inventors: Tetsuya Katagiri, Kyoto (JP); Koichi Kamon, Otokuni-gun (JP); Jun Takayama, Tama (JP)

(73) Assignee: Konica Minolta Holdings, Inc., Tokyo (JP)

( * ) Notice: Subject to any disclaimer, the term of this patent is extended or adjusted under 35 U.S.C. 154(b) by 958 days.

(21) Appl. No.: 11/699,590

(22) Filed: Jan. 29, 2007

(65) Prior Publication Data

US 2007/0182830 A1   Aug. 9, 2007

(30) Foreign Application Priority Data

Jan. 31, 2006 (JP) .............................. 2006-022271
Feb. 27, 2006 (JP) .............................. 2006-049518

(51) Int. Cl.
*H04N 5/228* (2006.01)
*H04N 5/76* (2006.01)
*H04N 7/14* (2006.01)
*H04N 5/445* (2006.01)
*G06K 9/36* (2006.01)

(52) U.S. Cl. .................. 348/222.1; 348/234; 348/14.13; 348/568; 382/232

(58) Field of Classification Search .............. 348/222.1, 348/234, 235, 229.1, 252, 370; 382/232, 382/273, 274
See application file for complete search history.

(56) References Cited

U.S. PATENT DOCUMENTS

| | | | | |
|---|---|---|---|---|
| 5,991,456 A | * | 11/1999 | Rahman et al. | 382/254 |
| 6,101,273 A | * | 8/2000 | Matama | 382/169 |
| 6,694,052 B1 | * | 2/2004 | Matama | 382/169 |
| 7,525,579 B2 | * | 4/2009 | Katagiri | 348/234 |
| 2001/0041004 A1 | * | 11/2001 | Shefer | 382/167 |
| 2003/0103141 A1 | * | 6/2003 | Bechtel et al. | 348/148 |
| 2007/0145136 A1 | * | 6/2007 | Wiklof et al. | 235/454 |

FOREIGN PATENT DOCUMENTS

| | | |
|---|---|---|
| JP | 63-306779 A | 12/1988 |
| JP | 2000-165754 A | 6/2000 |
| JP | 2000-165755 A | 6/2000 |
| JP | 2001-298619 A | 10/2001 |
| JP | 2002-77733 A | 3/2002 |

OTHER PUBLICATIONS

"Image Dynamic Range Compression Techniques", Image Lab, Jun. 2004, pp. 24-28, with partial English-language translation on p. 28.

* cited by examiner

*Primary Examiner*—Nhan T Tran
(74) *Attorney, Agent, or Firm*—Sidley Austin LLP

(57) ABSTRACT

An image sensing apparatus includes: an image sensing section for sensing an image of a subject; a detector for detecting a luminance of the subject; a compressor for compressing a dynamic range of the subject image; and a controller for controlling a compression characteristic to be used in compressing the dynamic range based on a detection result of the detector.

5 Claims, 18 Drawing Sheets

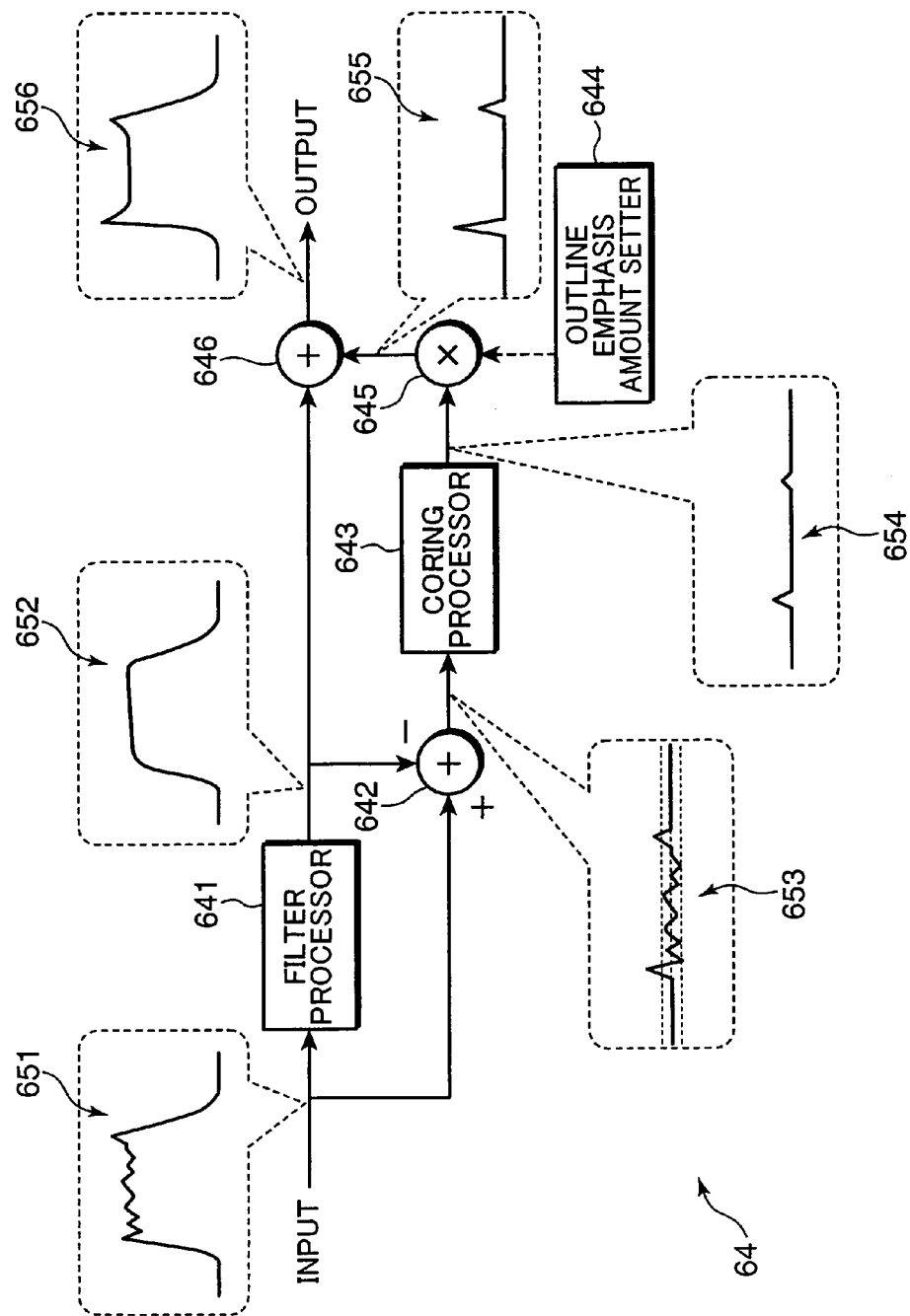

IMAGE SENSING APPARATUS AND IMAGE PROCESSING METHOD

This application is based on Japanese Patent Application No. 2006-22271 and No. 2006-49518 filed on Jan. 31, 2006 and Feb. 27, 2006, respectively, the contents of which are hereby incorporated by reference.

BACKGROUND OF THE INVENTION

1. Field of the Invention

The present invention relates to an image sensing apparatus, an image sensing system, and an image sensing method, and more particularly to an image sensing apparatus, an image sensing system, and an image sensing method for changing a dynamic range compression characteristic in accordance with a luminance of a subject.

2. Description of the Related Art

The pixel size of an image sensor is being decreased accompanied by a recent demand for a miniaturized and high pixel density image sensor. As a result, the illuminance range (so-called dynamic range) of the image sensor tends to be narrow, which may adversely affect the image quality. In view of this, there is a demand for securing a wide dynamic range of the image sensor.

In an attempt to solve the above drawback, various techniques are proposed. There is disclosed an image sensing apparatus (see e.g. Japanese Examined Patent Publication No. Hei 7-97841) for generating a composite image with a wider dynamic range than the dynamic ranges of individual screen images by sensing the screen images with different exposure amounts a certain number of times, selecting image areas having a proper exposure level from these screen images for image synthesis. There is also disclosed an image sensor (e.g. Japanese Unexamined Patent Publication No. 2000-165755) provided with a charge voltage converter, with plural capacitances having different voltage dependences, for converting a signal charge transferred from a photoelectric converter of the image sensor into a signal voltage to make the dynamic range variable. There is also disclosed a method (see e.g. Japanese Unexamined Patent Publication No. 2000-165754) for extending the dynamic range, with use of an image sensor provided with a number of capacitances for holding signal charges of photodiodes, by reading out signal charges acquired by one-time exposure a certain number of times while switching over the capacitance value, and by implementing summation with respect to the readout signals.

There is also proposed a logarithmic conversion type image sensor (hereinafter, called as "linear-logarithmic sensor", see e.g. Japanese Unexamined Patent Publication No. 2002-77733) for converting a photocurrent into a logarithmically compressed voltage, using a sub-threshold characteristic of an MOSFET, wherein output characteristics inherent to a solid-state image sensor i.e. a linear conversion operation of linearly converting an electric signal commensurate with an incident light amount for output, and a logarithmic conversion operation of logarithmically converting the electric signal commensurate with the incident light amount for output are automatically switched over by supplying a specific reset voltage to the MOSFET.

Whereas a sensing device such as the linear-logarithmic sensor has succeeded in securing a wide dynamic range, in the current technology, a display device such as a monitor has not succeeded in securing a wide dynamic range, as compared with the sensing device. Even if a wide dynamic range is obtained for an input image, the effect of the wide dynamic range cannot be satisfactorily exhibited on the display device. In other words, the technique of securing the dynamic range in the device for displaying, transferring, or storing an image sensed by the sensing device is limited. Even if a wide dynamic range image is obtained by the various methods as proposed above, it is difficult to process the entirety of the image information obtained by these methods. Accordingly, there is a need for a process of adjusting the dynamic range of an input image for the dynamic range of the device for transferring, storing, or displaying the image, while retaining useful information, relating to the wide dynamic range input image, which has been acquired by the aforementioned methods, for instance, a process (hereinafter, called as "dynamic range compression process") for compressing the dynamic range of the input image in such a manner that the wide dynamic range input image can be properly displayed with the dynamic range for the display device.

As an example of the dynamic range compression process, there is known a method for creating plural blurred images based on an original image acquired by an image sensor, and creating a composite blurred image based on the obtained blurred images to compress the dynamic range of the original image based on the composite blurred image. For instance, Japanese Unexamined Patent Publication No. 2001-298619 discloses an example of the dynamic range compression approach of varying a processing parameter for creating plural blurred images, or a processing parameter for creating a composite blurred image in compressing the dynamic range in accordance with a scene discrimination result regarding the original image, or photographic information attached to the original image.

The above technology discloses the dynamic range compression method, but does not disclose a gradation conversion method i.e. a contrast correction method, which is a process to be executed independently of the dynamic range compression e.g. a process to be executed after the dynamic range compression. Generally, a conversion process using a gradation conversion characteristic i.e. gamma ($\gamma$) is performed as the gradation conversion. Changing the gamma in such a manner as to increase the contrast in a low luminance area so as to optimize the contrast in a main subject area may unduly narrow the gradation in a high luminance area, which may lower the contrast in the high luminance area. The dynamic range compression process including the aforementioned technique has a drawback that a high frequency component i.e. an edge portion is relatively emphasized, because an illumination component primarily including a low frequency component is compressed, thereby generating an unnatural image with a high sharpness i.e. an image with an awkward resolution.

SUMMARY OF THE INVENTION

In view of the above problems residing in the conventional examples, it is an object of the invention to provide an image sensing apparatus, an image sensing system, and an image sensing method that enable to obtain a proper image despite a dynamic range compression.

An aspect of the invention is directed to an image sensing apparatus including: an image sensing section for sensing an image of a subject; a detector for detecting a luminance of the subject; a compressor for compressing a dynamic range of the subject image; and a controller for controlling a compression characteristic to be used in compressing the dynamic range based on a detection result of the detector.

These and other objects, features and advantages of the present invention will become more apparent upon reading the following detailed description along with the accompanying drawing.

BRIEF DESCRIPTION OF THE DRAWINGS

FIG. 20 is a functional block diagram of an outline emphasis processor in a sharpness corrector to describe an example of a modification of the sharpness correction process in accordance with the dodging parameter in the fifth embodiment.

DETAILED DESCRIPTION OF THE PREFERRED EMBODIMENTS OF THE INVENTION

Figure 1A:
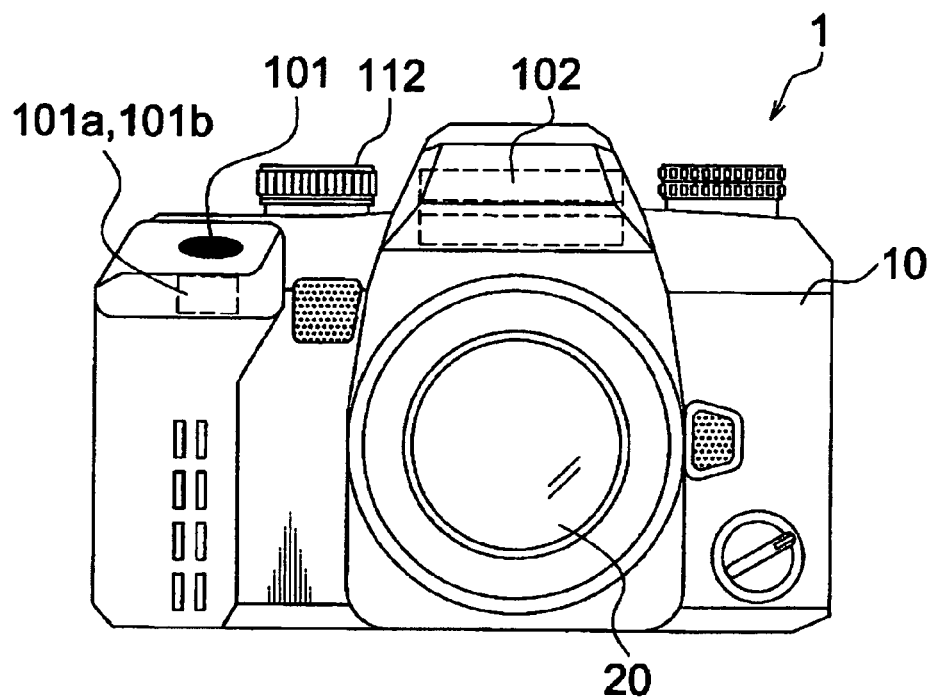
FIG. 1A is front view showing an external appearance of a digital camera, as an example of an image sensing apparatus embodying the invention.

In the following, preferred embodiments of the invention will be described referring to the drawings.

First Embodiment

Figure 1B:
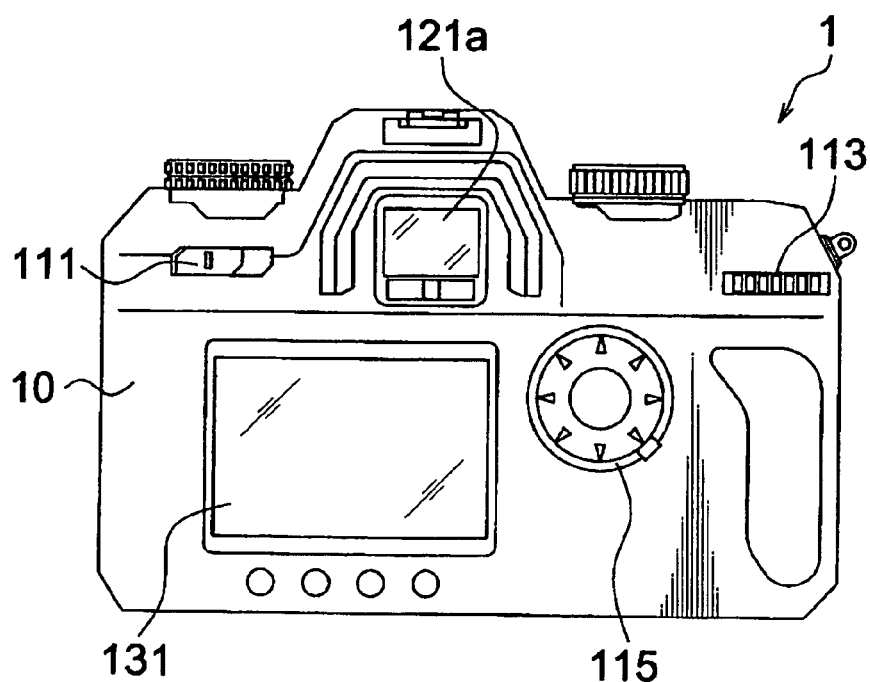
FIG. 1B is a rear view showing an external appearance of the digital camera as an example of the image sensing apparatus embodying the invention.
Figure 2:
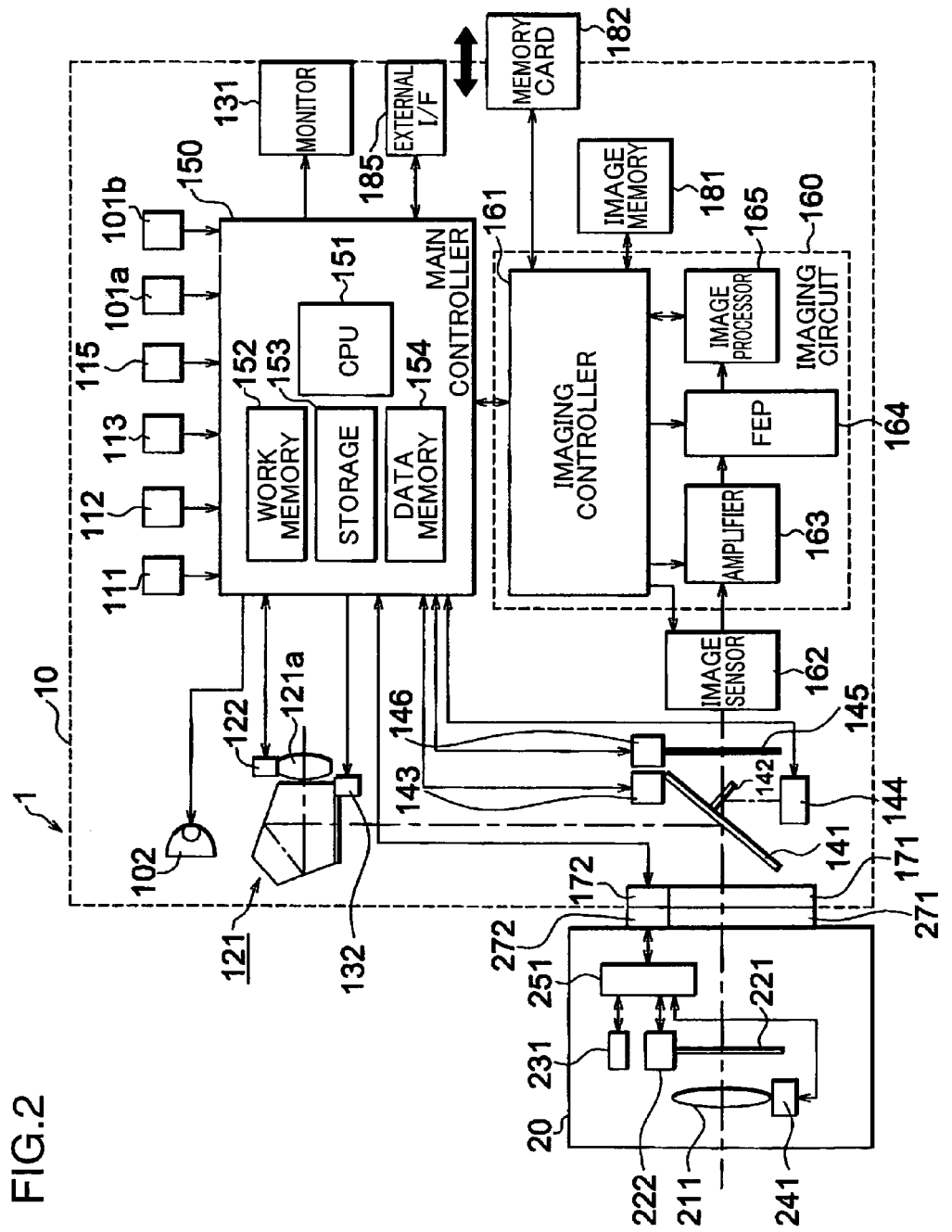
FIG. 2 is a functional block diagram showing an example of an electrical configuration of the digital camera shown in FIGS. 1A and 1B.

First, a digital camera as an example of an image sensing apparatus according to a first embodiment of the invention is described referring to FIGS. 1A, 1B, and 2. FIGS. 1A and 1B are external views of the digital camera, wherein FIG. 1A is a front view, and FIG. 1B is a rear view. Referring to FIG. 1A, an exchange lens unit 20 is mounted on a front surface of a camera body 10 of the digital camera 1. A release button 101 as an operation member for a sensing operation is provided on an upper surface of the camera body 10. A two-stage switch constituted of an AF switch 101a, which is actuated when the release button 101 is pressed down to a first predetermined position, and a release switch 101b, which is actuated when the release button 101 is pressed down to a second predetermined position, is provided at an inner position of the camera body 10 and below the release button 101. A flash section 102 is built in an upper part of the camera body 10. A mode setting dial 112 for setting the operation mode of the digital camera 1 is arranged on the upper part of the camera body 10.

As shown in FIG. 1B, there are provided, on a rear surface of the camera body 10, a power supply switch 111 for turning on or off the power source of the digital camera 1, a condition changing dial 113 for changing various setting conditions of the digital camera 1, a jog dial 115 constituted of five switches provided at upper, lower, left, right and middle positions to perform various settings at the operation modes of the digital camera 1, a viewfinder eyepiece lens element 121a, and a monitor section 131 for displaying a recorded image or various information relating to a photographing operation.

FIG. 2 is a functional block diagram showing an example of an electrical configuration of the digital camera 1 shown in FIGS. 1A and 1B. A main controller 150 for controlling the digital camera 1 controls overall operations of the digital camera 1, and includes a CPU (Central Processing Unit) 151, a work memory 152, a storage 153, and a data memory 154. The main controller 150 reads out various control programs from the storage 153 for outputting into the work memory 152 to control the respective parts of the digital camera 1 in accordance with the readout program. The data memory 154 stores various data relating to photometry or an AF (Auto-Focus) operation.

Also, the main controller 150 receives an input signal from the operation members such as the power supply switch 111, the mode setting dial 112, the condition changing dial 113, the jog dial 115, the AF switch 101a, and the release switch 101b. The main controller 150 controls a photometric operation by communicating with a photometry module 122 provided on an optical viewfinder section 121, and controls an AF operation by communicating with an AF module 144 in accordance with the input signal. The main controller 150 controls a mirror driver 143 to drive a reflex mirror 141 and a sub mirror 142, and controls a shutter driver 146 to drive a shutter 145, and controls the flash section 102 in accordance with the input signal. Further, the main controller 150 controls an image sensing operation by communicating with an imaging controller 161, and is operative to display a sensed image or various information relating to a photographing operation on the monitor section 131, and to display various information relating to the photographing operation on an in-finder display section 132.

Also, the main controller 150 communicates, via an external interface (I/F) 185, data concerning the sensed image, control signals for controlling the digital camera 1, or the like with a personal computer (PC) or a personal digital assistant externally connected to the digital camera 1. Also, the main controller 150 controls overall operations of the exchange lens unit 20 by communicating with a lens controller 241 for controlling focusing and zooming of a lens element 211, an aperture controller 222 for controlling an aperture of a diaphragm 221, and a lens information storage 231 for storing information inherent to the exchange lens unit 20, by way of a lens interface 251 of the exchange lens unit 20, via a body-side body-lens communicator 172 provided on a body mount portion 171 of the camera body 10 for balance photometry, and a lens-side body-lens communicator 272 provided on a lens mount portion 271 of the exchange lens unit 20, for communication between the camera body 10 and the exchange lens unit 20.

An image sensor 162 is a sensing device for sensing a subject light image, and photoelectrically converts the subject light image formed on the lens element 211 into image signals of color components of R, G, and B in accordance with an amount of the subject light image for outputting the image signals to an amplifier 163, which will be described later. The image signals are amplified by the amplifier 163, and then converted into digital data by a front end processor 164 (hereinafter, called as "FEP 164"), and are also subjected to a pre-processing such as black level correction or fixed pattern noise (hereinafter, called as "FPN") correction. Then, the processed data undergoes various image processing in an image processor 165 to be temporarily recorded into an image memory 181, and finally recorded into a memory card 182. These operations are controlled under the control of the main controller 150 by the imaging controller 161. The imaging controller 161, the amplifier 163, the FEP 164, and the image processor 165 constitute an imaging circuit 160.

Figure 9A:
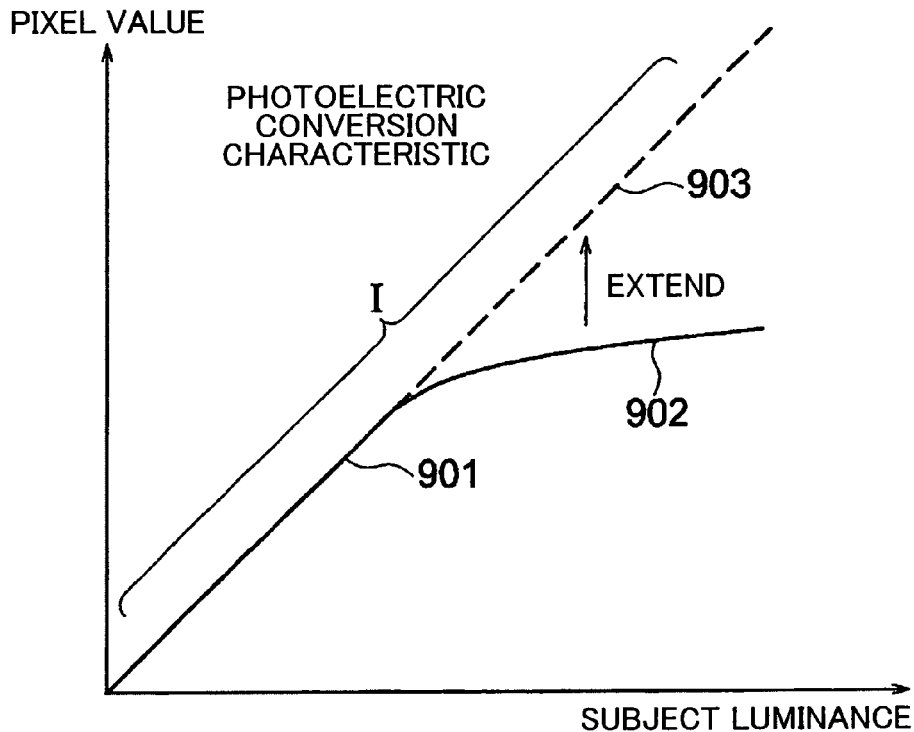
FIG. 9A is a graph for describing a method for obtaining plural images based on a single image obtained by a sensing operation of a linear-logarithmic sensor in a third embodiment of the invention, specifically a graph showing a photoelectric conversion characteristic of the linear-logarithmic sensor.

In this embodiment, there is used, as the image sensor 162, an image sensor (hereinafter, also called as "linear-logarithmic sensor" according to needs) having a photoelectric conversion characteristic with a linear conversion area where an output pixel signal i.e. an output electric signal generated by photoelectric conversion is linearly converted for output, when an incident luminance of the image sensor is low i.e. a dark image is sensed, and a logarithmic conversion area where the output pixel signal is logarithmically converted for output, when the incident luminance of the image sensor is high i.e. a bright image is sensed, in other words, a linear photoelectric conversion characteristic in a low luminance area, and a logarithmic photoelectric conversion characteristic in a high luminance area. A sensing operation by the linear-logarithmic sensor enables to acquire an image with a wide dynamic range. Acquiring an image with a wide dynamic range by the image sensor 162 enables to easily obtain a compression characteristic as shown in FIG. 9A, which will be described later.

The linear-logarithmic sensor is, for instance, a so-called CMOS (complementary metal-oxide semiconductor) image sensor produced by additionally providing a logarithmic conversion circuit with a P-type or an N-type MOSFET or a like device to a solid-state image sensor comprised of a multitude of photoelectric conversion elements such as photodiodes in a matrix so as to convert an output characteristic of the solid-state image sensor in such a manner that the electric signal is logarithmically converted commensurate with the incident light amount, by utilizing a sub-threshold characteristic of the MOSFET. The image sensor 162 may be a VMIS image sensor, a CCD (charge-coupled device) image sensor, or an equivalent sensor, in place of the CMOS image sensor.

An image having a linear characteristic area and a logarithmic characteristic area obtained by the linear-logarithmic sensor is also called as a "linear-logarithmic image" according to needs. A switching point (also called as an "inflection point") between the linear characteristic area and the logarithmic characteristic area concerning the photoelectric conversion characteristic is arbitrarily controllable by a predetermined control signal to be inputted to the respective pixel circuits of the image sensor 162. The image sensor 162 is not limited to the linear-logarithmic sensor, but may be any image sensor including a linear sensor having plural linear characteristic areas with different gradients, as far as a wide dynamic range image is obtainable. The wide dynamic range image may be a wide dynamic range image created based on plural frames of images obtained by sensing an image, with use of a general well-known linear sensor, with different shutter speeds or different aperture values, or may be a wide dynamic range image created based on a knee-processed image.

The image sensor 162 is not limited to the image sensor with the wide dynamic range, but may be a general well-known image sensor having a linear photoelectric conversion characteristic such as a CCD image sensor or a CMOS image sensor.

Figure 3:
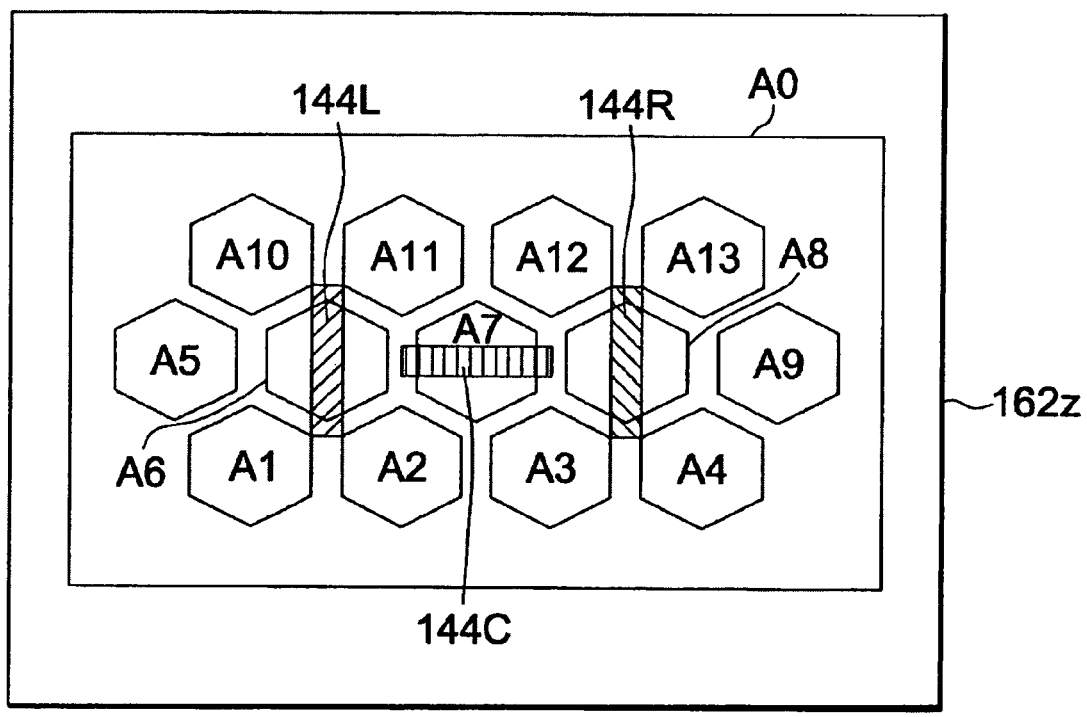
FIG. 3 is a diagram showing a relation among an image sensing area, a photometric area, and an AF area.

Next, an example of a photometric area to be measured by the photometry module 122, as an essential part of a detector for detecting the luminance of a subject is described referring to FIG. 3. FIG. 3 is a diagram showing a state that an image sensing area of the image sensor 162, a photometric area of the photometry module 122, and an AF area of the AF module 144 are optically superimposed one over the other on the field of a subject image.

The photometric area of the photometry module 122 includes fourteen photometric sections i.e. a photometric section A0 corresponding to the substantially whole area within the image sensing area 162z of the image sensor 162 for photometry, and photometric sections A1 through A13 obtained by dividing an inner area of the photometric section A0 into plural sections (in this embodiment, thirteen sections) for photometry. The main controller 150 calculates, as multi-area photometric data, fourteen Bv values from Bv(0) to Bv(13), which are brightness values with respect to the respective photometric sections A0 through A13, or fourteen Ev values from Ev(0) to Ev(13), which are exposure values with respect to the respective photometric sections A0 through A13, by APEX (Additive System of Photographic Exposure) calculation, based on outputs from respective areas of multi-area photometric devices mounted on the photometry module 122. Detailed description on the photometric calculation is omitted herein, since it is recited in e.g. Japanese Unexamined Patent Publication No. 2005-192139.

The AF area includes three AF sections i.e. an AF section 144C for metering light on the central part of a field i.e. a subject, an AF section 144L for metering light on a left portion of the subject, and an AF section 144R for metering light on a right portion of the subject. The main controller 150 determines e.g. a subject image within the AF area at a nearest distance as a main subject based on AF data outputted from the AF module 144 concerning these three AF sections, and controls the lens controller 241 to drive the lens element 211 for focusing on the main subject to obtain a focusing signal.

The above describes the case that three AF sections and fourteen photometric sections are provided to determine the position of the main subject by the AF operation. The configuration on the AF sections and the photometric sections is not limited to the foregoing, and may be arbitrarily modified as far as such a modification does not depart from the gist of the embodiment. Also, the AF section to which the main subject is assumed to belong is not necessarily determined by the AF operation, but may be determined by manual selection by the user i.e. the photographer, or other means.

Figure 4:
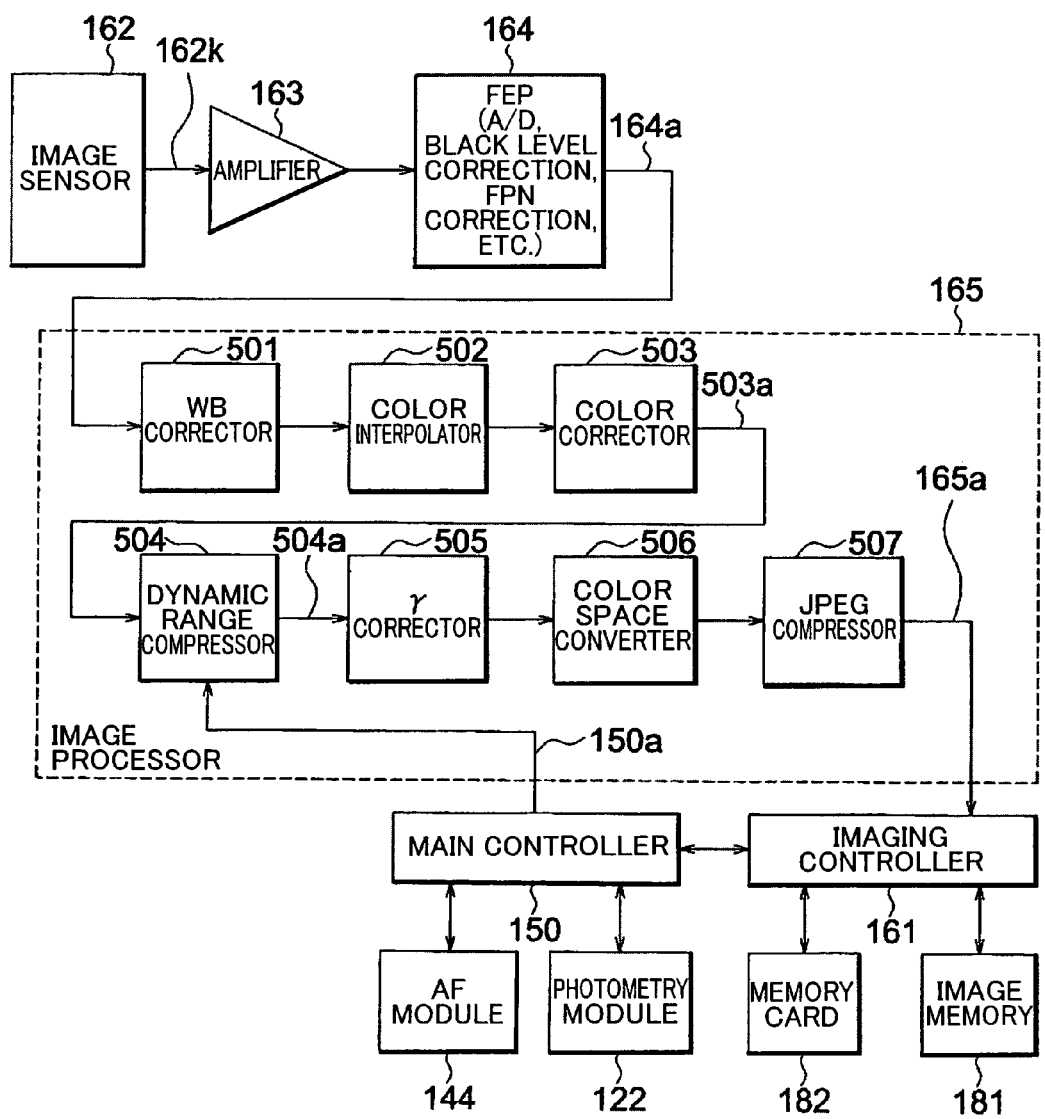
FIG. 4 is a circuit block diagram showing an image processor and its periphery in the first embodiment of the invention.

FIG. 4 is a circuit block diagram showing the image processor 165 and its periphery in the first embodiment. Referring to FIG. 2, when the AF switch 101a is turned on i.e. depressed, the photometry module 122 performs a multi-area photometry, and the AF module 144 performs an AF operation. Then, when the release switch 101b is turned on, the reflex mirror 141 and the sub mirror 142 are moved to their respective mirror-up positions, and the shutter 145 is opened. Then, the subject image is formed on the image sensor 162 through the lens element 211. The multi-area photometry by the photometry module 122 functions as a detecting step in an image sensing method to be described later.

The foregoing describes the case that the photometry module 122 performs the photometry. Alternatively, the photometry may be performed by a so-called video AE using an image sensed by the image sensor. In the alteration, for instance, an image is divided into plural blocks consisting of m blocks in horizontal direction and n blocks in vertical direction where m and n are positive integers, and an average luminance Iv(i,j) with respect to each block is obtained based on an average of pixel values with respect to each block. The average luminance Iv(i,j) is expressed by: Iv(i,j)=log 2(average pixel value with respect to block (i,j)). Iv(i,j) may be used for calculation of a compression characteristic in a similar manner as the Bv value or the Ev value.

Referring to FIG. 4, image data 162k obtained by the image sensor 162 is amplified by the amplifier 163, and then, the amplified image data is subjected to a pre-processing such as black level correction and FPN correction for conversion into digital image data 164a. The digital image data 164a is then outputted to the image processor 165. When the digital image data 164a is inputted to the image processor 165, the digital image data 164a undergoes white balance correction by a WB (white balance) corrector 501, color interpolation by a color interpolator 502, and color correction by a color corrector 503 to be outputted to a dynamic range compressor 504, as corrected image data 503a. The respective processes to be executed by the WB corrector 501, the color interpolator 502, and the color corrector 503 may be general well-known processes.

Referring back to the operation of the main controller 150, the main controller 150 calculates a dynamic range compression parameter by the below-mentioned method based on the output from the photometry module 122, and the calculated dynamic range compression parameter is outputted to the dynamic range compressor 504, as a dynamic range compression characteristic control signal 150a. The corrected image data 503a which has been inputted to the dynamic range compressor 504 undergoes the below-mentioned dynamic range compression process in accordance with the dynamic range compression characteristic control signal 150a outputted from the main controller 150 for output as dynamic range compressed data 504a. Thereafter, the dynamic range compressed data 504a undergoes gamma correction by a gamma corrector 505, color space correction by a color space converter 506, and then compression with a proper compression ratio by a JPEG compressor 507 to be outputted to the imaging controller 161, as an image signal 165a. The respective processes to be executed by the gamma corrector 505 and the color space converter 506 may be general well-known processes. After having been outputted to the imaging controller 161, the image signal 165a is temporarily recorded into the image memory 181 by the imaging controller 161 under the control of the main controller 150, and then, is finally recorded into the memory card 182.

Figure 5:
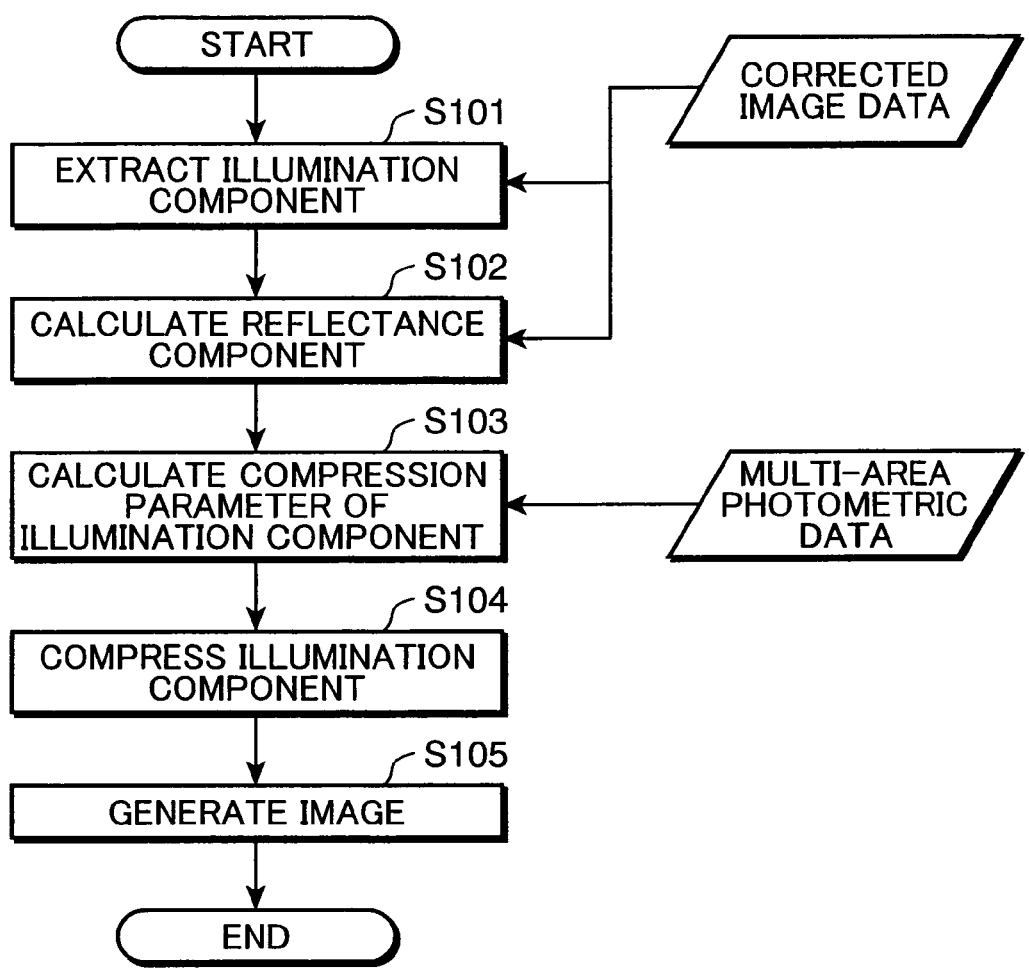
FIG. 5 is a flowchart showing an example of an operation of a dynamic range compression process.

Next, the dynamic range compression process to be executed by the dynamic range compressor 504 is described referring to FIG. 5. FIG. 5 is a flowchart showing an example of an operation of the dynamic range compression process to be executed by the dynamic range compressor 504. First, in Step S101, an illumination component i.e. an illuminated image or an illumination component image is extracted from the corrected image data 503a. Generally, an image I is expressed as a product of an illumination component L and a reflectance component R i.e. a reflectance image, according to the Retinex theory, as expressed by the following formula (1).

$$I = L * R \tag{1}$$

where the symbol "*" denotes multiplication. The same definition is applied to the below-mentioned description. Various approaches for extracting the illumination component L may be applied, including an approach of extracting a low frequency component exclusively from the image I using a low-pass filter, and an approach of extracting an illumination component, using a median filter, an E filter, or the like (e.g. see "ε-separation non-linear digital filter and its application" by Harashima et al., Institute of Electronics, Information and Communication Engineers (IEICE), Vol. J65-A, No. 4, pp. 297-304, April 1982).

Next, in Step S102, the reflectance component R is obtained by dividing the image I by the illumination component L, as expressed by the following formula (2).

$$R = I/L \tag{2}$$

where the symbol "/" denotes division. The same definition is applied to the below-mentioned description.

In Step S103, a compression ratio c, as a compression parameter of the illumination component L to be used in the below-mentioned method, is calculated based on the aforementioned multi-area photometric data. In Step S104, a compression process is performed with respect to the illumination component L. Specifically, assuming that the illumination component after compression is L', the illumination component L' is expressed by the following formula (3).

$$L' = n * L^c \tag{3}$$

where the symbol "n" denotes a regularization term, and the exponent "c" denotes the compression ratio c.

Then, in Step S105, by multiplying i.e. synthesizing the illumination component L' after compression by the reflectance component R, as expressed by the following formula (4), a dynamic range compressed image I' i.e. a synthesized image I' is obtained.

$$I = L' * R \tag{4}$$

In the above description, Step S103 functions as a calculating step in the below-mentioned image sensing method, and Step S104 functions as a compressing step in the image sensing method.

Figure 6A:
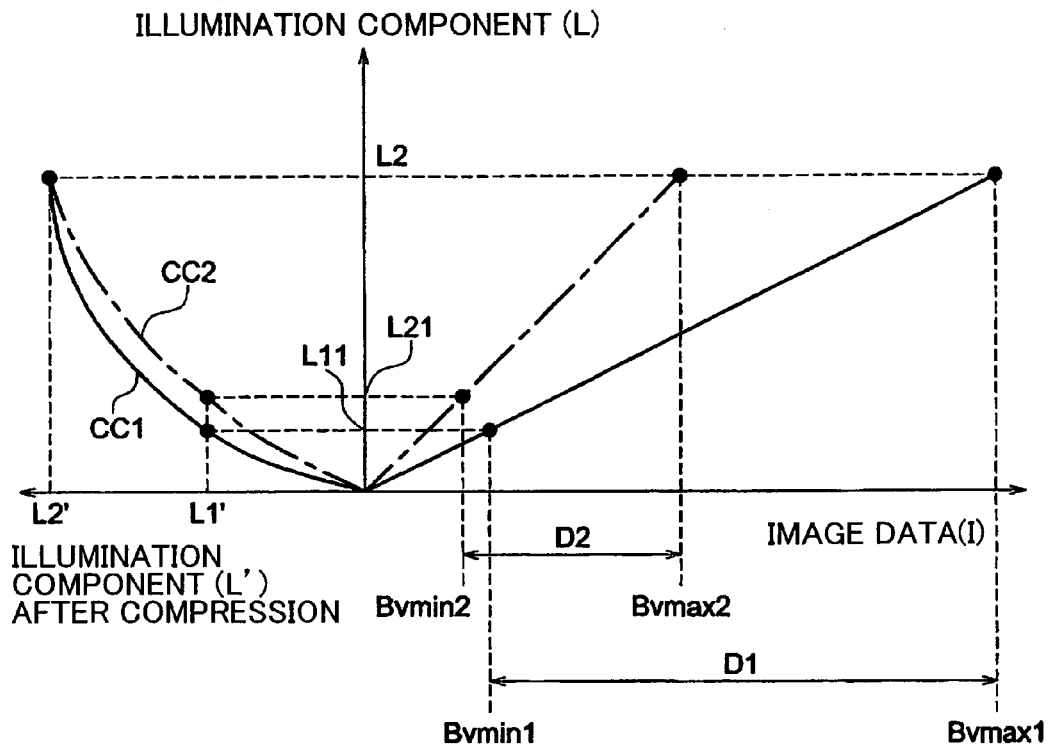
FIG. 6A is a graph for describing an approach of obtaining a compression characteristic of an illumination component.
Figure 6B:
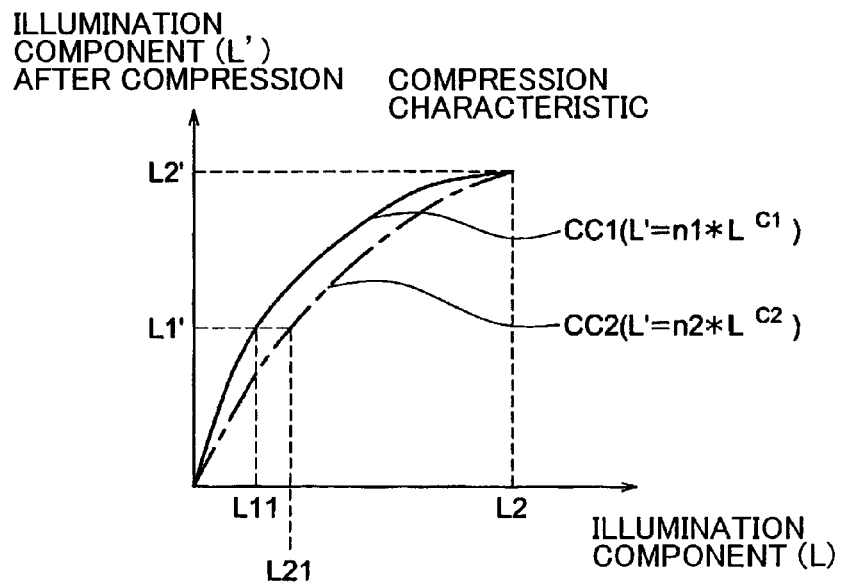
FIG. 6B is a graph for describing an approach of obtaining a compression characteristic of an illumination component.

Next, description is made regarding "calculation of compression parameter of illumination component" to be executed in Step S103 in FIG. 5, referring to FIGS. 6A and 6B. FIGS. 6A and 6B are graphs each describing an approach for calculating the compression ratio c, as the compression parameter of the illumination component L. Referring to FIG. 6A, on the right portion of the graph, the axis of abscissas shows the image data I obtained by the image sensor, and the axis of ordinate shows the illumination component L extracted from the image data I; and on the left portion of the graph, the axis of ordinate shows the illumination component L, and the axis of abscissas shows the illumination component L' after compression. In this embodiment, the exposure control of the digital camera 1 is conducted in such a manner that the aperture value and the shutter speed are controlled so that the image data corresponding to the area where the maximal luminance Bvmax is given from the multi-area photometric data attains a maximal output value of the image sensor 162. For sake of easy explanation, description is made based on a premise that the illumination component L extracted from the image data I is proportional to the image data I.

First, description is made for a case that there is a large difference D1 (=Bvmax1−Bvmin1) between the maximal subject luminance Bvmax1 and the minimal subject luminance Bvmin1 concerning the multi-area photometric data, in other words, a case that a value obtained by subtracting the minimal value Bvmin1 from the maximal value Bvmax1 i.e. a difference value between the maximal value and the minimal value is large. The difference D1 may be an absolute value of the difference between the maximal value Bvmax1 and the minimal value Bvmin1. The same idea is applied to the below-mentioned difference D2. When the aforementioned exposure control method is applied to the digital camera 1, the image data concerning the photometric section where the maximal value Bvmax1 is given with respect to the multi-area photometry becomes a maximal output value to be outputted from the image sensor 162. Accordingly, the illumination component to be extracted from the image data becomes a maximal value L2 of the illumination component L i.e. an illumination component value L2. This results in setting the illumination component to be extracted from the image data concerning the photometric section where the minimal value Bvmin1 is given with respect to the multi-area photometry to an extremely small value L11 i.e. an illumination component value L11, which results in formation of a dark distorted image.

In the above condition, let us assume a compression characteristic curve CC1 capable of converting the illumination component value L11 into an illumination component value L1' having proper brightness, and converting the maximal value L2 of the illumination component into a value L2'. Applying the compression characteristic curve CC1 enables to convert the dark distorted image into an image with proper brightness, and to attain intended image reproducibility without likelihood that a brightest image portion may not be unnaturally bright. In the above condition, the compression characteristic curve CC1 that passes the point (L11, L1'), and the point (L2, L2') in the left-side graphical expression of FIG. 6A is expressed by the following formula (5).

$$L'=n1*L^{C1} \quad (5)$$

where the symbol "n1" denotes a regularization term, and the exponent "c1" denotes a compression ratio.

Similarly to the above, in the case where there is a small difference D2 (=Bvmax2−Bvmin2) between the maximal subject luminance Bvmax2 and the minimal subject luminance Bvmin2 concerning the multi-area photometric data, in other words, a case that a value obtained by subtracting the minimal value Bvmin2 from the maximal value Bvmax2 i.e. a difference value between the maximal value and the minimal value is small, the illumination component to be extracted from the image data concerning the photometric section where the minimal value Bvmin2 is given with respect to the multi-area photometry becomes an illumination component value L21, which is larger than the minimal value Bvmin1. In this case, similarly to the above, assuming a compression characteristic curve CC2 capable of converting the illumination component L21 into an illumination component value L1' with proper brightness, and converting the maximal value L2 of the illumination component into a value L2', the compression characteristic curve CC2 is expressed by the following formula (6).

$$L'=n2*L^{C2} \quad (6)$$

where the symbol "n2" denotes a regularization term, and the exponent "c2" denotes a compression ratio. It should be noted that the compression ratios c1 and c2 satisfy the relation: c1<c2.

The relationship between the illumination component L and the illumination component L' after compression is shown in FIG. 6B. FIG. 6B shows substantially the same graphical expression as the left-side graphical expression of FIG. 6A. Specifically, FIG. 6B shows the compression characteristic curve CC1 in the case where the difference between the maximal value Bvmax and the minimal value Bvmin of the subject luminance is large, and the compression characteristic curve CC2 in the case where the difference between the maximal value Bvmax and the minimal value Bvmin of the subject luminance is small. As mentioned above, within the coordinate space of FIG. 6B, the compression characteristic of the illumination component is defined in such a manner that as the difference D between the maximal value and the minimal value of the subject luminance is increased, the compression characteristic curve with a large curvature i.e. the compression characteristic curve CC1 is applied, and that as the difference D is decreased, the compression characteristic curve approximate to a linear curve i.e. the compression characteristic curve CC2 is applied. The dynamic range compression characteristic is controlled based on the compression characteristic curve.

Thus, calculating the compression ratio c, as the compression parameter of the illumination component L, using the difference D between the maximal value Bvmax and the minimal value Bvmin of the subject luminance based on the multi-area photometric data enables to execute the computation of obtaining the compression ratio c at a very high speed, as compared with a conventional case that a bright or dark scene is discriminated based on the original image. This enables to perform the compression process of the illumination component at a high speed, and to obtain a dynamic range compressed image having proper brightness. Also, obtaining a relation between the compression ratio c, and the difference D between the maximal value Bvmax and the minimal value Bvmin of the subject luminance in advance for storage in terms of a lookup table (LUT) or a like format, and reading out the compression ratio c from the lookup table, according to needs, enables to simplify the computation of the compression ratio c and to expedite the computation processing.

Second Embodiment

Figure 7:
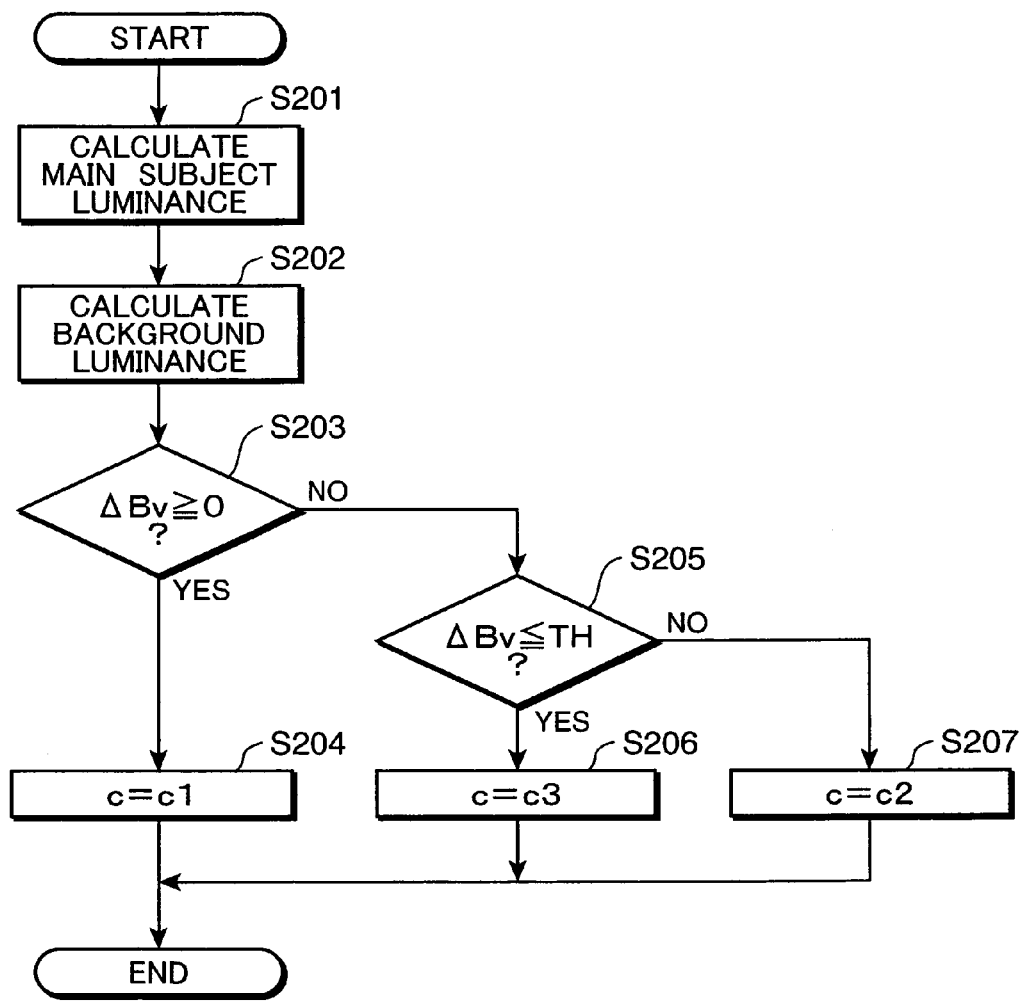
FIG. 7 is a flowchart showing an example of a method for determining a compression ratio in a second embodiment of the invention.

In this section, a second embodiment of the invention is described referring to FIG. 7. FIG. 7 is a flowchart showing an example of a method for determining the compression ratio c in the second embodiment. In this embodiment, the compression ratio c of the illumination component is determined by: defining a central part of an image screen i.e. a central area A7 of a photometric device 122a shown in FIG. 3, as a main subject area; defining a part other than the central part as a background area; and obtaining a main subject luminance Bvmain, and a background luminance Bvsub e.g. an average luminance concerning the background area, based on multi-area photometric data. The main subject area is not limited to the central area A7, but may be an area designated by e.g. the user, or any area including a focusing area obtained based on the result of an AF operation, as described referring to FIG. 3.

Referring to FIG. 7, first, in Step S201, the main subject luminance Bvmain is obtained based on the photometric data concerning the central area A7 obtained by multi-area photometry. Then, in Step S202, the background luminance Bvsub is obtained based on the average value of the photometric data concerning the areas other than the central area A7 obtained by the multi-area photometry. Then, in Step S203, it is confirmed whether a difference ΔBv (=Bvmain−Bvsub) between the main subject luminance Bvmain and the background luminance Bvsub i.e. a difference value obtained by subtracting the background luminance Bvsub from the main subject luminance Bvmain is equal to or larger than 0, in other words, whether a scene is to be photographed, with the sun behind the photographer, where the main subject luminance is equal to or larger than the background luminance. If the scene is to be photographed with the sun behind the photographer (YES in Step S203), in Step S204, the compression ratio c of the illumination component is set to a small value c1, and the routine is ended. By implementing the above operations, the compression characteristic has a flat i.e. linear gradient with respect to the entirety of the compression characteristic, thereby securing proper gradations over the entirety of the image.

If the scene to be photographed is a backlit scene (NO in Step S203), in Step S205, it is confirmed whether a difference between the main subject luminance Bvmain and the background luminance Bvsub: (Bvmain−Bvsub) is equal to or smaller than a predetermined threshold value e.g. a backlit discrimination value TH where TH is a negative number, in other words, whether the scene to be photographed is a severely backlit scene where the main subject luminance is considerably lower than the background luminance. If it is judged that the scene to be photographed is the severely backlit scene (YES in Step S205), in Step S206, the compression ratio c of the illumination component is set to a large value c3, and the routine is ended. By implementing the above operations, the gradient of the compression characteristic in the low luminance area is increased, and gradation performance i.e. contrast with respect to the subject with a low luminance i.e. the low luminance area including the main subject image is secured. The backlit discrimination value TH may be a predetermined fixed value, or may be arbitrarily set by the user.

If the scene to be photographed is neither a scene with the sun behind the photographer nor a severely backlit scene, in other words, a slightly backlit scene where the main subject luminance is slightly lower than the background luminance, i.e., the main subject image is slightly dark (NO in Step S205), in Step S207, the compression ratio c of the illumination component is set to an intermediate value c2, and the routine is ended. In this embodiment, the compression ratios c1, c2, and c3 satisfy the relation: c1<c2<c3. Thereby, in case of photographing a slightly backlit scene, an intermediate compression characteristic between the compression characteristic to be used in the scene with the sun behind the photographer, and the compression characteristic to be used in the severely backlit scene is adopted.

Figure 8:
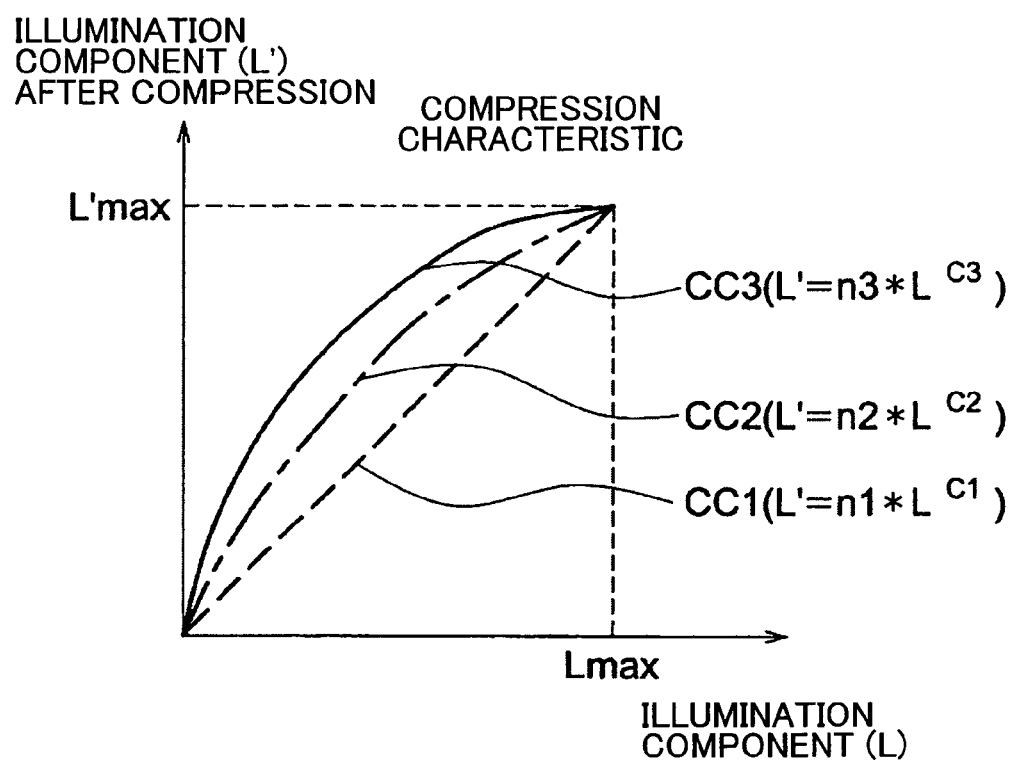
FIG. 8 is a graph showing a relation between an illumination component and an illumination component after compression in the second embodiment.

FIG. 8 shows a relationship between the illumination component L and the illumination component L' after compression in the case where the compression ratio of the illumination component defined by the above-mentioned approach is used as a parameter. As described above, in this embodiment, the dynamic range compression characteristic is controlled by: comparing the main subject luminance with the background luminance; decreasing the compression ratio of the illumination component, as the main subject luminance is increased; and by increasing the compression ratio, as the background luminance is increased, and more particularly, by dividing the scene to be photographed into multiple-stage scenes i.e. a scene with the sun behind the photographer, a severely backlit scene, and a slightly backlit scene, based on the main subject luminance and the background luminance.

In the above arrangement, as shown in FIG. 8, the compression characteristic curve to be used in a scene with the sun behind the photographer has a flat gradient over the entirety of the compression characteristic, as shown by the curve CC1 expressed by: $L'=n1*L^{C1}$, thereby securing gradation performance over the entirety of the image. The compression curve to be used in a severely backlit scene has a steep gradient in a low luminance area, as shown by the curve CC3 expressed by: $L'=n3*L^{C3}$, thereby securing gradation performance with respect to the subject with a low luminance, i.e. the low luminance area including the main subject image. The compression characteristic curve to be used in a slightly backlit scene has an intermediate compression characteristic between the compression characteristic to be used in the scene with the sun behind the photographer, and the compression characteristic to be used in the severely backlit scene, as shown by the curve CC2 expressed by: $L'=n2*L^{C2}$, with an intermediate gradient between the gradient corresponding to the compression ratio c1 and the gradient corresponding to the compression ratio c3.

The above describes the case that the relationship between the main subject luminance and the background luminance concerning a subject image is defined in terms of three kinds of photographic scenes i.e. a scene with the sun behind the photographer, a slightly backlit scene, and a severely backlit scene. Alternatively, the relationship may be defined more roughly e.g. in terms of two or less kinds of conditions, or more finely e.g. in terms of four or more kinds of conditions. For instance, the subject may be classified into a first main subject, a second main subject, and a background.

Third Embodiment

In this section, a third embodiment of the invention is described. In this embodiment, dynamic range compression is performed by applying a method called Goshtasby method. The Goshtasby method is, similarly to the technology disclosed in Japanese Examined Patent Publication No. Hei 7-97841, directed to sensing screen images with different exposure amounts a certain number of times to acquire a proper image, using the obtained screen images. The details of the Goshtasby method are recited in e.g. "Fusion of Multi- Exposure Images", by A. Goshtasby, Image and Vision Computing, Vol. 23, 2005, pp. 611-618".

Figure 9B:
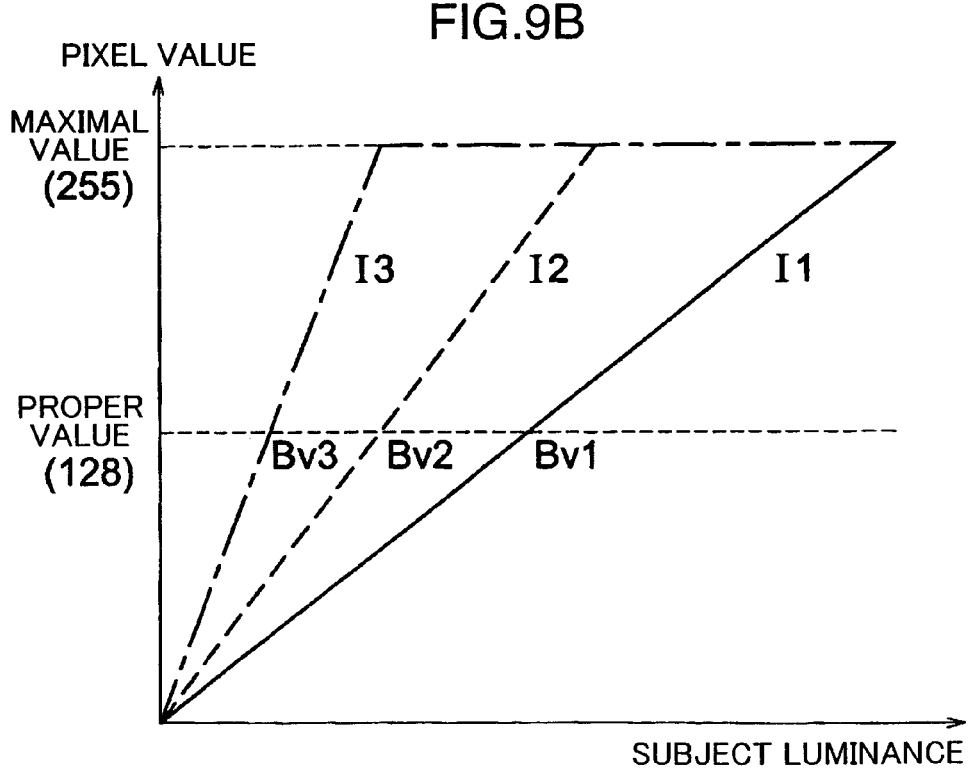
FIG. 9B is a diagram showing a method for obtaining plural images based on a single image obtained by a sensing operation of the linear-logarithmic sensor in the third embodiment, specifically, a graph for describing a method for creating plural images.

In the third embodiment, a single image obtained by a linear-logarithmic sensor is used, in place of the plural images with different exposure amounts. In the following, the third embodiment is described referring to FIGS. 9A and 9B. FIGS. 9A and 9B are graphs for describing an approach of obtaining plural images based on a single image obtained by the linear-logarithmic sensor. Specifically, FIG. 9A is a graph showing a photoelectric conversion characteristic of the linear-logarithmic sensor, and FIG. 9B is a graph for describing an approach of creating the plural images. In these graphs, the axes of abscissas represent a subject luminance value, and the axes of ordinate represent a pixel value of the image sensor, wherein the axes of abscissa and the axes of ordinate both display the respective values in terms of a linear expression.

Referring to FIG. 9A, the photoelectric conversion characteristic of the linear-logarithmic sensor includes a linear characteristic i.e. a characteristic 901 in FIG. 9A in a low luminance subject area, and a logarithmic characteristic i.e. a characteristic 902 in FIG. 9A in a high luminance subject area. Extending a portion corresponding to the logarithmic characteristic 902 where the image is logarithmically compressed i.e. a logarithmic image to a linear characteristic 903 by implementing a computation i.e. a characteristic conversion process with respect to the linear-logarithmic image obtained by the linear-logarithmic sensor enables to generate an image I with a linear characteristic over the entirety of the photoelectric conversion characteristic i.e. a totally linear image I. Also, photometric data Bv(1) through Bv(N) (in the example of FIG. 3, N=13) concerning the respective photometric sections obtained by multi-area photometry are obtained by implementing the method described referring to FIG. 3, or a like method.

Next, referring to FIG. 9B, images I1 through IN with their gradients being corrected so that the photometric data Bv(1) through By(N) attain a proper pixel value (for instance, in the case where the maximal pixel value is 8-bit, the proper pixel value is 128) are created by computation based on the totally linear image I. For instance, in the case where the photometric data concerning a certain photometric section has a brightness value e.g. Bv1, an image I1 with a moderate gradient is obtained. The image I1 has a low contrast, although the original image is satisfactorily reproduced without likelihood that an unnaturally bright image portion may not appear over the entirety of the image. In the case of the photometric data concerning a certain photometric section has a brightness value e.g. Bv3, an image I3 with a steep gradient is obtained. The image I3 has a relatively high contrast in the low luminance area, although all the bright image portions are unnaturally bright. In the case where the photometric data concerning a certain photometric section has an intermediate brightness value e.g. Bv2 between Bv1 and Bv3, an intermediate image I2 between the image I1 and the image I3 is obtained.

Then, a dynamic range compression characteristic is determined, using the thus-obtained images I1 through IN. Since the operations to be implemented thereafter are substantially the same as those recited in the aforementioned technical document, the operations are briefly described. First, each of the images I1 through IN is divided into plural blocks i.e. block areas consisting of m blocks in horizontal direction and n blocks in vertical directions where m and n are positive integers, and entropy E, which is a criterion representing the contrast of the image, is calculated with respect to each of the blocks. When the entropy of a color image at the block (j,k) is defined as Ec(jk), Ec(jk) is expressed by the following formula (7).

$$Ec(jk) = \sum_{i=0}^{255} -p_i^r \log(p_i^r) + \sum_{i=0}^{255} -p_i^g \log(p_i^g) + \sum_{i=0}^{255} -p_i^b \log(p_i^b) \quad (7)$$

where the symbol "$p_i$" denotes event probability of the pixel value i within the block, and the symbols "r", "g", and "b" respectively denote a red (R) pixel, a green (G) pixel, and a blue (B) pixel.

Next, a block where a maximal contrast is given i.e. a block image is selected from the blocks at positions corresponding to each other among the images I1 through IN, e.g. the blocks at the same positions among the images I1 through IN (in this embodiment, thirteen blocks) with respect to each of the blocks. The image number $I_{jk}$ attached to the image where a maximal contrast is given is the number of the image where a largest entropy is given among the N images concerning the block (i,j). If the thus selected m×n images are synthesized without any processing, a resultant image may have incongruity i.e. boundaries between the block images where an unduly large difference concerning a luminance value remains. Accordingly, so-called blend processing is executed to generate an image with no or less incongruity. An output image O(x,y) obtained after the blend processing is expressed by the following formula (8).

$$O(x, y) = \sum_{j=1}^{m} \sum_{k=1}^{n} W_{jk}(x, y) I_{jk}(x, y) \quad (8)$$

where the symbol "$W_{jk}$" denotes a weight expressed by the following formula (9), and the symbols "$I_{jk}(x,y)$" denotes a pixel value of the image where a maximal entropy is given concerning the block (j,k).

$$W_{jk}(x, y) = \frac{G_{jk}(x, y)}{\sum_{j=1}^{m} \sum_{k=1}^{n} G_{jk}(x, y)} \quad (9)$$

where the symbol "$G_{jk}(x,y)$" denotes a Gaussian expression represented by the following formula (10).

$$G_{jk}(x, y) = \exp\left\{-\frac{(x - x_{jk})^2 + (y - y_{jk})^2}{2\sigma^2}\right\} \quad (10)$$

where the symbol "$x_{jk}$" and "$y_{jk}$" i.e. "$(x_{jk}, y_{jk})$" denotes a coordinate at the central pixel within the block, and the symbol "σ" denotes a standard deviation.

In this embodiment, the dynamic range compression characteristic is controlled by: creating plural images based on a detection result of the photometric device with respect to a single image obtained by the linear-logarithmic sensor; dividing each of the created images into an arbitrary number of blocks; and selecting an image with a high contrast with respect to each of the blocks. Additionally implementing the blend processing enables to perform dynamic range compression desirably and readily, thereby, generating a natural image. The series of operations as mentioned above may be executed by the main controller 150, the image processor 165, or an equivalent device. In other words, a proper image can be obtained despite the dynamic range compression. In the first through the third embodiments, a parameter for dynamic range compression can be readily obtained by calculating the parameter for dynamic range compression based on information relating to the subject luminance obtained in sensing the original image, and dynamic range compression can be performed without impairing the useful information included in the original image.

Fourth Embodiment

Figure 10:
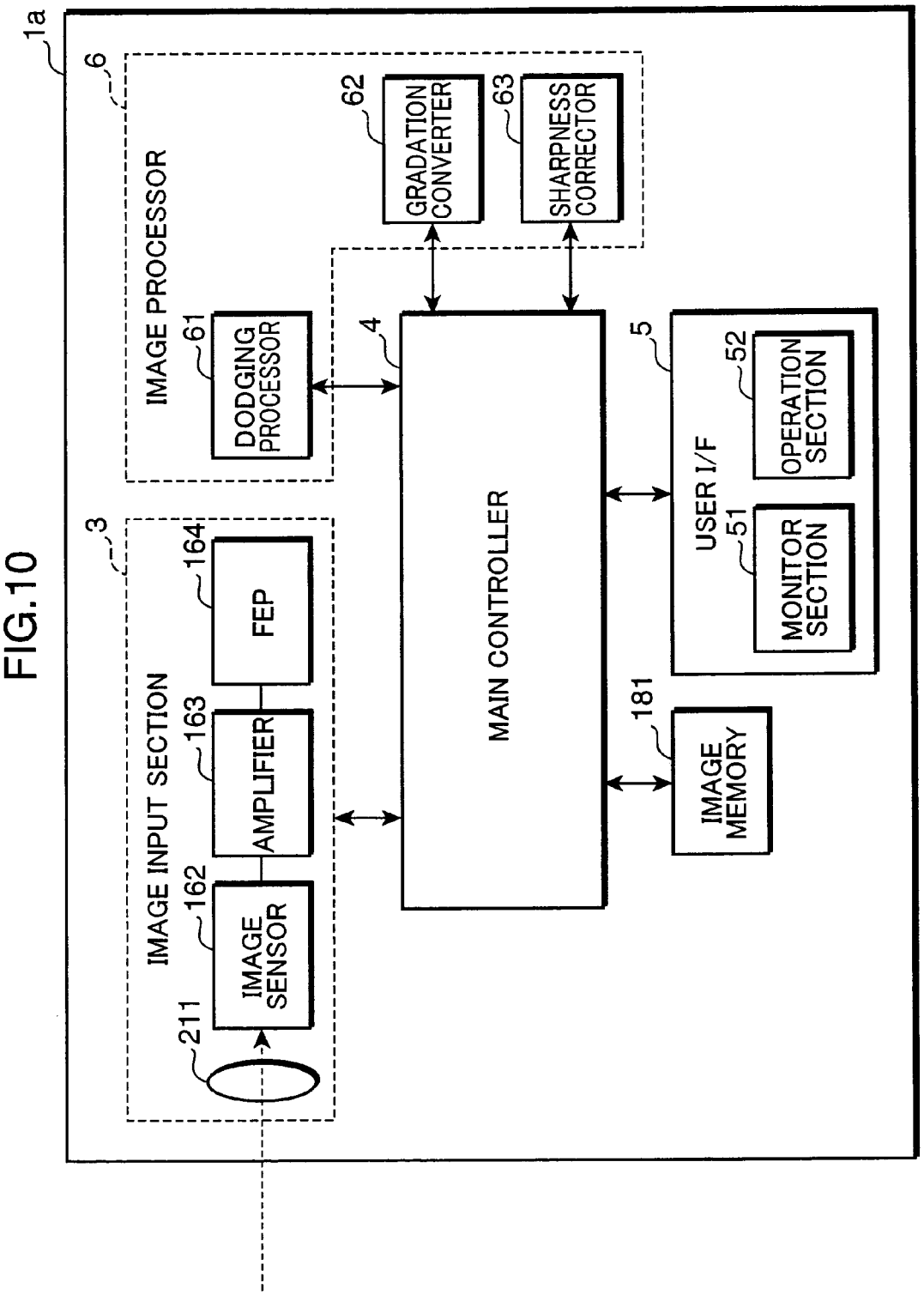
FIG. 10 is a schematic functional block diagram primarily concerning an image sensing process to be executed by a digital camera, as an example of an image sensing apparatus according to a fourth embodiment of the invention.

FIG. 10 is a functional block diagram primarily showing an image sensing process to be executed by a digital camera 1a, as an example of an image sensing apparatus according to a fourth embodiment of the invention. As shown in FIG. 10, the digital camera 1a includes an image input section 3, a main controller 4, a user I/F (interface) 5, and an image processor 6.

The image input section 2 is adapted to input an image into the digital camera 1a, and includes a lens element 211, an image sensor 162, an amplifier 163, and an FEP 164 equivalent to the corresponding ones described in the first through the third embodiments.

Similarly to the main controller 150, the main controller 4 includes an ROM in which various control programs and the like are recorded, an RAM for temporarily storing data, and a CPU for reading out the control programs and the like from the ROM for execution. The main controller 4 controls overall operations of the digital camera 1a. The main controller 4 calculates control parameters and the like required for operating the respective parts of the digital camera 1a including the image sensor 162, based on various signals outputted from the respective parts of the digital camera 1a, and controls the operations of the respective parts of the digital camera 1a including a dodging processor 61 to be described later, based on the control parameters. The main controller 4 is also connected to an image memory 181 or an equivalent device.

The user I/F 5 functions as an enter key through which the user is allowed to designate various operation commands, or is operative to display predetermined information. The user I/F 5 has a monitor section 51 and an operation section 52. The monitor section 51 displays an image inputted through the image input section 2, an image stored in the image memory 181, predetermined operation information, setting information, or the like. For instance, the monitor section 51 includes a liquid crystal display (LCD) provided with a color liquid crystal display device. The operation section 52 is a member through which the user is allowed to enter an operation command to the digital camera 1a. The operation section 52 includes various switches i.e. buttons such as a release switch, a photographing mode setting switch, and a menu selection switch. For instance, the image sensor 162 executes a series of image sensing operations: sensing light from a subject in response to e.g. turning on of the release switch; performing a predetermined image processing with respect to an image obtained by the sensing operation to output image data; and recording the image data into the image memory 181. The monitor section 51 corresponds to the monitor section 131 in the foregoing embodiments, and the operation section 52 corresponds to the various members including the release switch 101, the AF switch 101a, the release switch 101b, the power supply switch 111, the mode setting dial 112, the condition changing dial 113, and the jog dial 115 in the foregoing embodiments.

Figure 18:
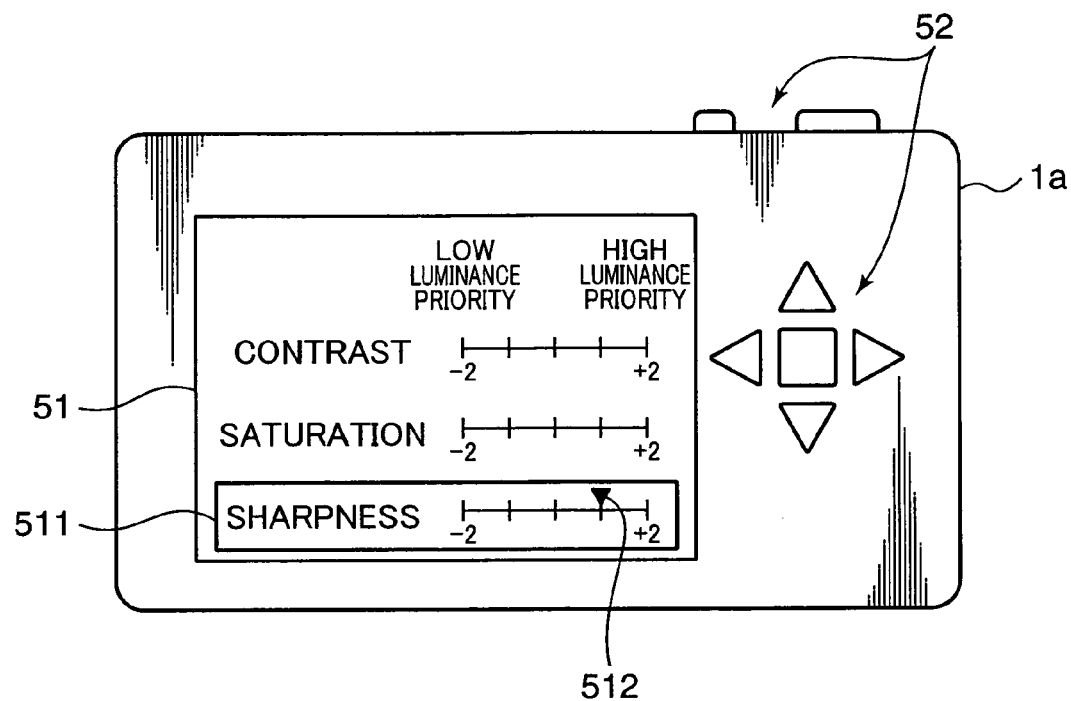
FIG. 18 is a rear view showing a user interface of the digital camera shown in FIG. 10, specifically showing a state that sharpness is selected, and a pointer is moved to the level +1.

As shown in e.g. FIG. 18, which is a rear view of the digital camera 1a, the user I/F 5 is configured in such a manner that the user is allowed to set i.e. enter various parameters (hereinafter, also called as "image processing parameters") relating to image processing such as contrast correction amount, saturation correction amount, and sharpness correction amount. Each of the image processing parameters has a scale of adjustment in five stages e.g. from −2 to +2. As an actual input operation, for instance, let us presume that the user moves a selected frame of image 511 to a predetermined position corresponding to an intended image processing parameter on the screen of the monitor section 51 by manipulating a button or the like on the operation section 52, and the image processing parameter to be corrected is selected i.e. activated. In the example of FIG. 18, sharpness is selected. Then, when the user shifts a pointer 512 from a default position (in this example, 0) to an intended level position in the range from −2 corresponding to a low luminance priority position to +2 corresponding to a high luminance priority position, the user is allowed to set a correction amount of the intended image processing parameter. In the example of FIG. 18, the sharpness correction amount is set to the level "+1".

The image processor 6 is adapted to execute various image processing with respect to the sensed image data inputted through the image input section 2 i.e. a digital image signal obtained by the FEP 164. The image processor 6 includes the dodging processor 61, a gradation converter 62, and a sharpness corrector 63. The dodging processor 61 executes a dodging process with respect to an image.

In this section, the idea on the dodging process is described. As described above, dynamic range compression has two meanings: one is to locally adjust the contrast of an image by compressing an illumination component of the image; and the other is to literally compress the dynamic range while maintaining the contrast distribution with respect to the entirety of the image. In other words, the latter technique has no relation to performing local adjustment on the contrast. The former technique is called as "dodging process", and the latter technique is called as "dynamic range compression" to distinguish one from the other. Similarly to the process as mentioned above, the dodging process comprises: extracting an illumination component from an original image; and performing a dynamic range compression with respect to the illumination component so that a new image, with its contrast being locally adjusted, is generated based on the illumination component i.e. a low frequency component and the reflectance component i.e. a high frequency component after the dynamic range compression. The reflectance component is extracted at the time when the illumination component is extracted. The dodging process to be executed in the fourth embodiment will be described later in detail. The image processor in the fourth embodiment corresponds to the image processor 165 in the foregoing embodiments, and the dodging processor 61 is provided in place of the dynamic range compressor 504.

The gradation converter 62 is adapted to perform gradation conversion by performing data conversion with respect to each of pixel data of R, G, and B of an input image i.e. a sensed image, using table information for gradation conversion, which is supplied from the main controller 4, specifically, a gradation conversion characteristic calculator 42, which will be described later. The gradation converter 62 in the fourth embodiment is provided in place of the gamma corrector 505 in the foregoing embodiments.

The sharpness corrector 63 is adapted to perform sharpness correction with respect to the input image by performing filter computation, using predetermined filter coefficient information for sharpness correction, which is supplied from the main controller 4. Similarly to the image processor 165, the image processor 6 may include a color interpolator, a color corrector, a WB corrector, an FPN corrector, or a black reference corrector (all of which are not illustrated), in addition to the aforementioned functional parts.

In the fourth embodiment, the gradation conversion process is performed by determining a parameter (also, called as a "gradation conversion parameter") relating to the gradation conversion process in accordance with the parameters (also, called as "dodging parameters") relating to the dodging process. In other words, the fourth embodiment has a primary feature that the gradation conversion process is controlled in accordance with the dodging parameters. In the following, the respective function parts of the dodging processor 61 and the main controller 4 are described.

The dodging processor 61 performs a dodging process with respect to an image inputted through the image input section 2 i.e. an image (also, called as a linear-logarithmic image, or a wide dynamic range image) obtained by a sensing operation of the image sensor 162. An original image I to which the dodging process is applied is also expressed by the aforementioned formula (1).

The dodging processor 61 extracts the illumination component L by applying a so-called edge preserving filter such as a median filter or an E filter, which is also called as a non-linear filter or an illumination extracting filter, with respect to the original image I. The dodging processor 61 also extracts the remainder component of the original image I as the reflectance component R, which is obtained by extracting the illumination component L from the original image I. The information relating to the filter size Sf of the edge preserving filter is supplied from the main controller 4. The filter size corresponds to the image size constituted of plural pixels, which is determined based on an idea as to for how many pixels an averaging process is to be executed in conducting a filter process with respect to the image. For instance, the filter size may correspond to a pixel group consisting of 10 pixels, 20 pixels, etc.

In view of the above, it can be conceived that the dodging process is a local computation process, in which computation is performed locally with respect to each of image areas obtained by dividing an image into plural areas. In this embodiment, the filter size of the edge preserving filter is used as the size of each of the image areas i.e. an area size. Alternatively, the size of each block obtained by dividing an image into plural blocks may be used. In this sense, information relating to the area size including the filter size and the block size may be handled as the dodging parameter. The local process may include e.g. a contrast correction process. In other words, the dodging process may be a process for performing contrast correction with respect to each of the image areas i.e. local contrast correction. In this sense, the area size may be handled as a dodging parameter for the local contrast correction.

Next, the dodging processor 61 performs conversion according to the below-mentioned formula (11) i.e. dynamic range compression with respect to an area where the level of the extracted illumination component L is equal to or larger than a predetermined compression start level Ls (L≧Ls). Conversion according to the below-mentioned formula (12), which is also included in the dynamic range compression, is performed with respect to an area where the level of the extracted illumination component L is smaller than the compression start level Ls (L<Ls).

$$L'=\exp(\log(L)*c)*n \tag{11}$$

where the symbol "c" denotes a compression ratio, and the symbol "n" denotes a regularization term.

$$L'=L \tag{12}$$

Figure 12:
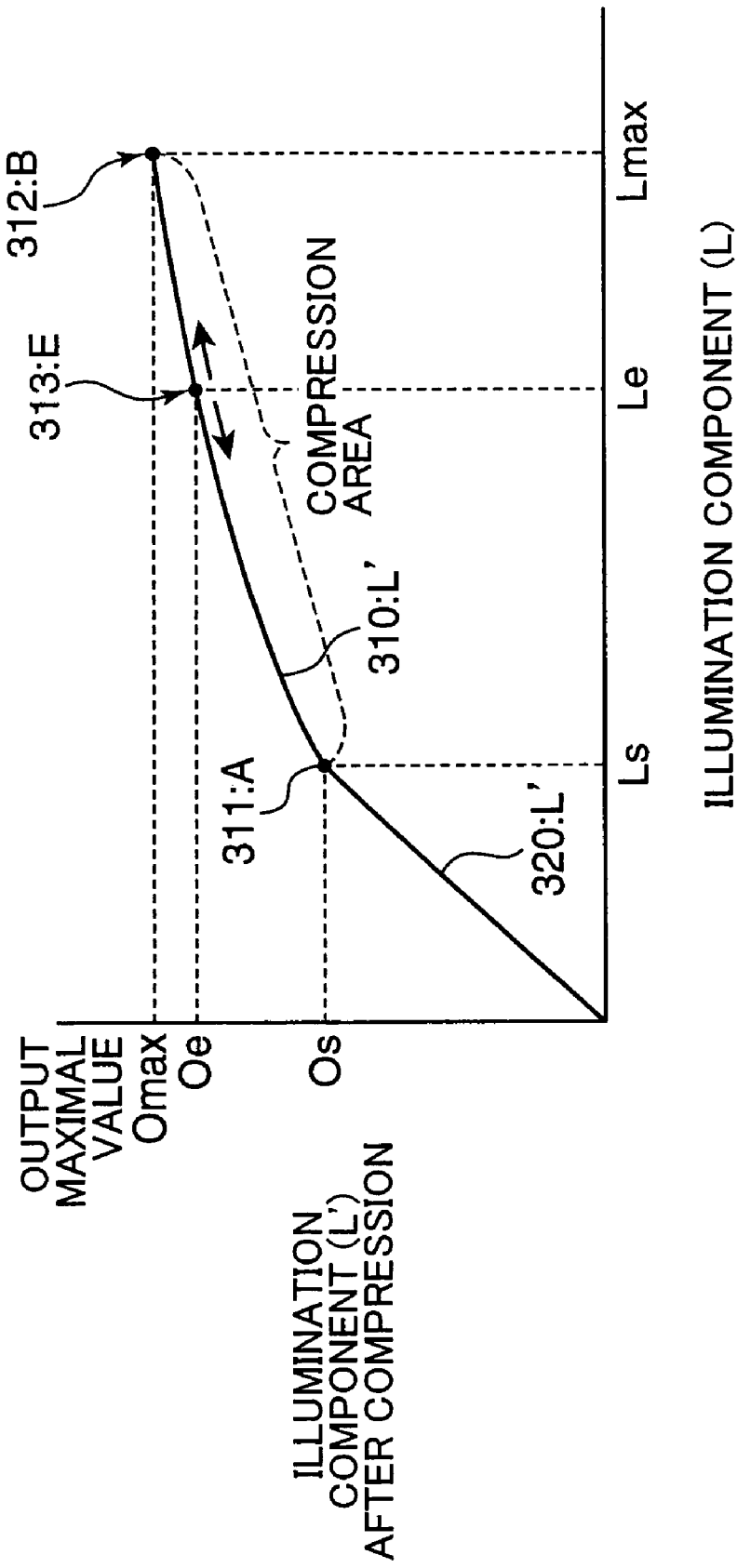
FIG. 12 is a graph showing an example of a compression characteristic of an illumination component to be used in a dodging process.

"L'" in the above formulae (11) and (12) are respectively indicated by illumination compression characteristics 310 and 320 in FIG. 12. The illumination compression characteristic 310 is given as a curve that passes the point A (Ls, Os), which is indicated by the reference numeral 311, where Ls is the predetermined compression start level of the illumination component L, and Os is a compression start level as an output value with respect to Ls, and that passes the point B (Lmax, Omax), which is indicated by the reference numeral 312, where Lmax is an upper limit value of the illumination component L, and Omax is an output maximal value with respect to the upper limit value Lmax. For instance, in the case where an output image obtained by the image sensor 162 is an 8-bit image having gradations from 0 to 255, Omax is an output value corresponding to 255 in gradation level, i.e. a gradation value. Accordingly, the compression ratio c and the regularization term n in the formula (11), which are the unknown numbers, are calculated by a simultaneous equation obtained by substituting the coordinate values at the two points A and B, respectively. The information relating to Ls and Lmax is given from the main controller 4.

After the aforementioned processes are executed, the dodging processor 61 is operative to generate i.e. output an image I', using the below-mentioned formula (13), which is equivalent to the formula (4), based on the illumination component L' after the dynamic range compression, and the reflectance component R.

$$I'=L'*R \tag{13}$$

The formula (13) may be conceived to be equivalent to the equation: I'=L'/L*I. However, the equation I'=I may be used, in place of the equation: I'=L'/L*I, concerning the area where the level of the illumination component L is smaller than the compression start level Ls (L<Ls).

Figure 11:
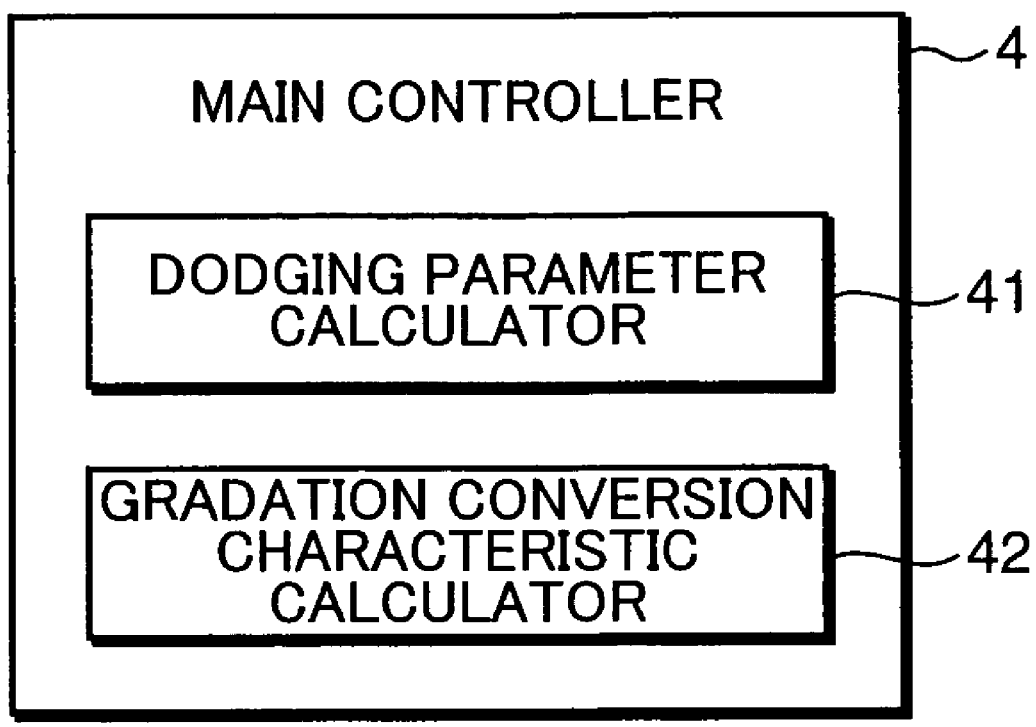
FIG. 11 is a functional block diagram of a controller in the digital camera shown in FIG. 10.

The main controller 4 includes, as shown in FIG. 11, a dodging parameter calculator 41 and the gradation conversion characteristic calculator 42. The dodging parameter calculator 41 is adapted to calculate i.e. acquire the dodging parameters such as Ls, Lmax, and the filter size Sf to be used in the dodging process. Ls is given as a value about twice as large as a main subject luminance 10, which will be described later referring to FIG. 13, and is supposed to have proper brightness by performing gamma correction in the gradation converter 62 i.e. by conducting a gradation conversion process using gamma. Ls may be a fixed value which is predefined depending on the subject e.g. a person or a landscape, or may be arbitrarily designated by the user by way of the user I/F 5 each time a sensing operation is conducted.

Lmax is given as a predetermined upper limit value for determining a brightness limit in the dodging process i.e. an upper limit of the luminance of the illumination component L to be compressed. Generally, a luminance maximal value concerning R, G, B components of the original image I i.e. a wide dynamic range image is used as Lmax. Alternatively, the maximal value of the illumination component L, Y % of the maximal value (considering a case that L max may be set to a value smaller than the maximal value of the illumination component to raise the contrast), X % of the maximal luminance value concerning R, G, B components, or the like may be used. Lmax may be calculated each time a sensing operation is conducted, or may be a predetermined fixed value, or may be designated by the user by way of the user I/F 5 each time a sensing operation is conducted. The filter size Sf may be given as a predetermined value, or a value dependent on the image, e.g. a value dependent on Z % value of the image size or a space frequency of the image. The dodging parameter calculator 41 sends the information relating to Ls, Lmax, and Sf to set the information in the dodging processor 61. The information relating to the aforementioned values may be stored in a parameter storage (not shown) provided e.g. in the main controller 4.

The gradation conversion characteristic calculator 42 calculates a gradation conversion characteristic to be used in the gradation conversion process by the gradation converter 62, based on the dodging parameters obtained by the dodging parameter calculator 41, and creates a conversion table e.g. a lookup table (LUT), in which the gradation conversion characteristic is described, i.e., the gradation conversion using the gradation conversion characteristic is applied. The gradation conversion characteristic calculator 42 sends the information relating to the created conversion table to the gradation converter 62 to set the information in the gradation converter 62. The gradation conversion characteristic calculated by the gradation conversion characteristic calculator 42 is e.g. gradation conversion characteristics 410 and 420 shown in FIGS. 13 and 14. The axes of abscissa and the axes of ordinate in FIGS. 13 and 14 respectively represent input in the gradation conversion, and output in the gradation conversion. The gradation conversion characteristic 410 is expressed by a curve that passes the coordinate origin (0, 0) indicated by the reference numeral 411, and the point (Omax, Omax) indicated by the reference numeral 412, and also passes the point C (I0, I0') indicated by the reference numeral 413, and the point D (Ls, Ls') indicated by the reference numeral 414. The gradation conversion characteristic 420 is expressed by a curve that passes the coordinate origin (0, 0) indicated by the reference numeral 411, and the point (Omax, Omax) indicated by the reference numeral 412, and also passes the point C (I0, I0') indicated by the reference numeral 413, and the point D (Ls, Ls') indicated by the reference numeral 415. In particular, the gradation conversion characteristics 410 and 420 are controlled by changing the positions of the two points i.e. points C and D. In this sense, the points C and D may be defined as first and second control points, respectively.

The first control point C (I0, I0') is a point of level at which proper brightness is attained by gamma correction. The input value I0 in the first control point C is a value corresponding to the luminance of e.g. a main subject e.g. the face of a person. In other words, I0 represents the main subject luminance. The output value I0' is an output value approximate to 128 gradation in the case of e.g. an 8-bit image.

The second control point D (Ls, Ls') is a point indicating the compression start level to be set in accordance with the gradients of the illumination compression characteristics 310 and 320 in FIG. 12 i.e. a gradient of a characteristic graph, specifically, the gradient of the illumination compression characteristic 310 expressed by the formula (11) i.e. a compression area or a compression characteristic, in other words, in accordance with the parameter representing the gradient of the illumination compression characteristic. The parameter representing the gradient of the illumination compression characteristic corresponds to a parameter to be used in the dodging process of performing compression of the illumination component, using the illumination compression characteristic in FIG. 12, i.e. a "dodging parameter".

A moderate gradient concerning the compression area means a larger input area with respect to an output area, assuming that the axis of abscissas and the axis of ordinate in FIG. 12 respectively represent input and output. In other words, this case means that a degree of compression i.e. a compression ratio is large. Conversely, a steep gradient concerning the compression area means that a degree of compression is small. The gradient concerning the compression area is determined by two points i.e. the point A (Ls, Os), and another point i.e. the point E (Le, Oe) indicated by the reference numeral 313.

The second control point D (Ls, Ls') is determined depending on the parameter representing the gradient concerning the compression area. Specifically, the second control point D (Ls, Ls') is determined, using information relating to the two points, as the parameter representing the gradient. In this embodiment, the second control point D is determined, using the information relating to the two points i.e. the point A and the point B, in place of the point A and the point E. In this case, it is conceived that the point E is coincident with the point B, or the point E is replaced by the point B. In the fourth embodiment, the information relating to the points A and B is used. Alternatively, as far as the gradient concerning the compression area can be determined, at least two points including the point A and another point whose level is larger than that of the point A may be used. Specifically, the information relating to the points A and B are respectively Ls and Lmax, which are values of the illumination components on the axis of abscissa in FIG. 12 i.e. the aforementioned dodging parameters Ls and Lmax. The second control point D is determined in accordance with the values of the dodging parameters Ls and Lmax.

Figure 13:
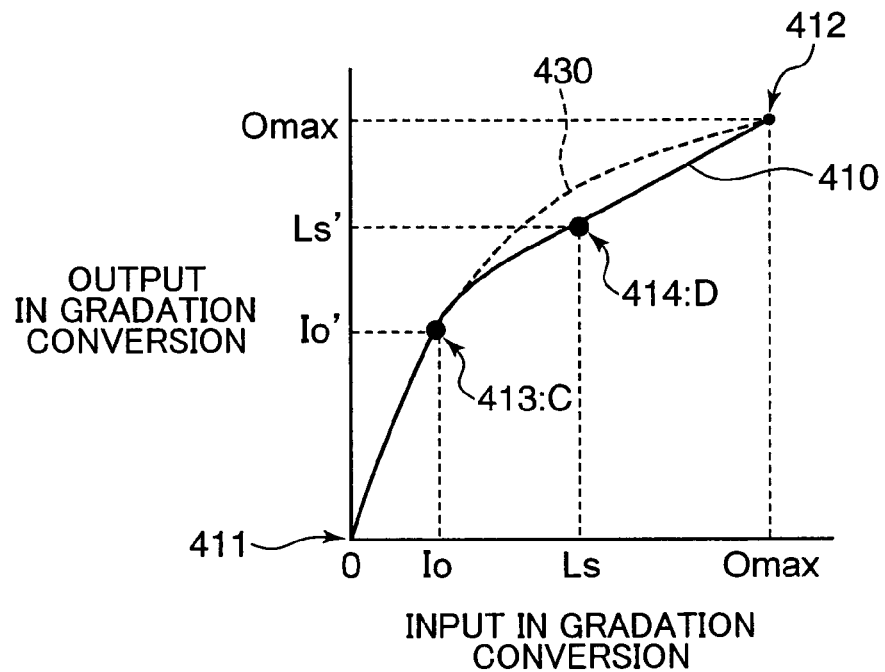
FIG. 13 is a graph showing an example of a gradation conversion characteristic to be used in a gradation conversion process.
Figure 14:
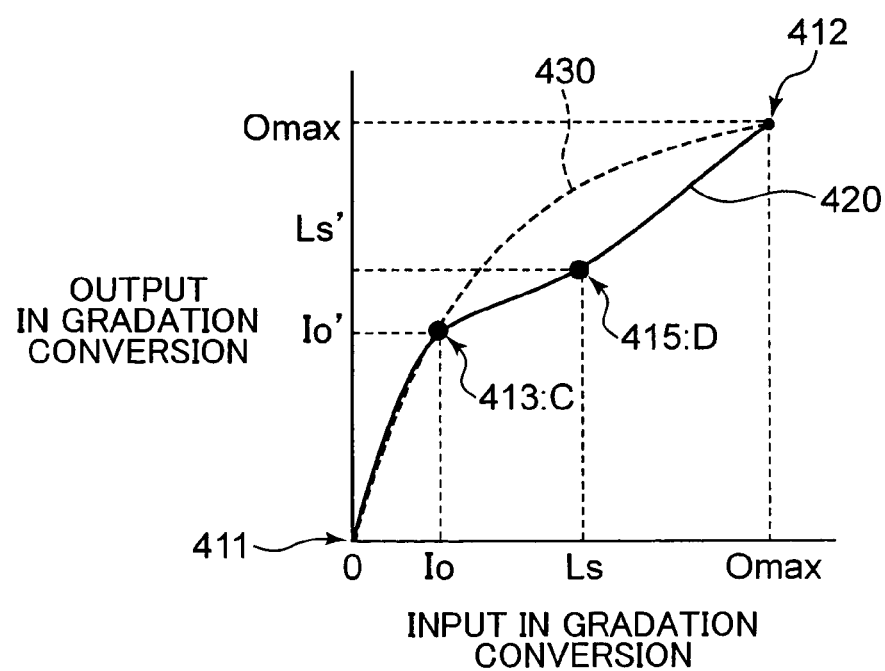
FIG. 14 is a graph showing an example of the gradation conversion characteristic to be used in the gradation conversion process.

Specifically, the input value Ls in the second control point D (Ls, Ls') corresponds to the compression start level Ls of the illumination component L shown in FIG. 12 i.e. the dodging parameter Ls. On the other hand, the output value Ls' is set in accordance with the magnitude of the upper limit value Lmax of the illumination component L shown in FIG. 12. In other words, Ls' is dependent on Lmax, and is given by the equation: Ls'=f(Lmax). The value "f" in the equation: Ls'=f (Lmax) represents a monotonically decreasing function. "Monotonic decrease" includes any condition including linear decrease, as far as increase is not observed. Considering the above, FIG. 13 shows a condition that Lmax is small, and FIG. 14 shows a condition that Lmax is large. In other words, in the case where Lmax is small, namely, the dynamic range i.e. a compression luminance area in the dodging process is narrow (in this case, the gradient concerning the compression area is steep), as shown in FIG. 13, the output level of Ls' is set high, so that a higher gradation conversion output is obtained in an intermediate luminance area or a high luminance area whose level is equal to or higher than the point C. On the other hand, in the case where Lmax is large, namely, the dynamic range in the dodging process is wide (in this case, the gradient concerning the compression area is moderate), as shown in FIG. 14, the output level of Ls' is set low, so that a gradation conversion output is suppressed in the intermediate luminance area or the high luminance area. Thus, the gradation conversion characteristic is determined based on the information relating to the compression start level Ls in the dodging process, and the luminance level Le (in this embodiment, Lmax) which is higher than the compression start level Ls.

The second control point D (Ls, Ls'), the gradation conversion characteristic based on the second control point D, or the conversion table corresponds to the gradation conversion parameter. A characteristic curve 430 shown in FIGS. 13 and 14 represents a generally well-known gamma characteristic. The first and second control points C and D are controlled i.e. set in such a manner that these two control points C and D do not exceed the respective corresponding levels of the gamma characteristic 430. In this embodiment, it is essential to control the gradation conversion characteristic based on the second control point D in the aspect of setting the gradation conversion parameter in accordance with the dodging parameter. It is, however, preferable to implement control based on the first control point C so as to obtain a more proper image.

Figure 15:
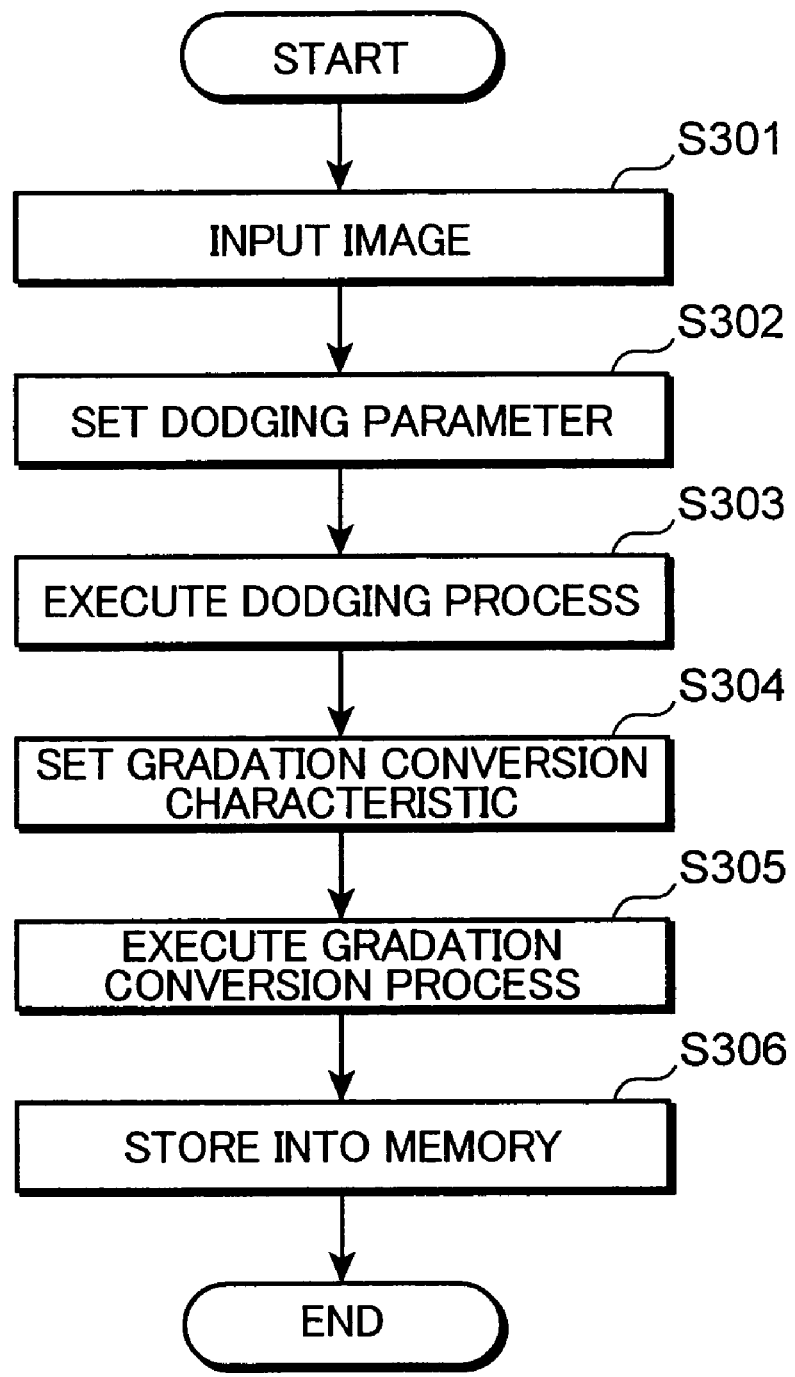
FIG. 15 is a flowchart showing an example of an operation concerning the gradation conversion process in accordance with a dodging parameter in the fourth embodiment.

FIG. 15 is a flowchart showing an example of an operation of the gradation conversion process to be executed in accordance with the dodging parameter according to the fourth embodiment. First, in response to e.g. turning on of the release switch, the image sensor 162 is operative to acquire a sensed image to output sensed image data to the main controller 4 for storage into e.g. the image memory 181 (Step S301). Then, the dodging parameter calculator 41 of the main controller 4 sends, to the dodging processor 61, the dodging parameter i.e. the information relating to the compression start level Ls and the upper limit value Lmax (see FIG. 12), as well as the information relating to the filter size Sf, for setting (Step S302).

Then, the dodging processor 61 performs a dodging process based on the set dodging parameter i.e. extracts the illumination component L from the original image I for dynamic range compression, and generates a new image I' based on the illumination component L' and the reflectance component R (Step S303). Then, the gradation conversion characteristic calculator 42 of the main controller 4 calculates the gradation conversion characteristic (see FIGS. 13 and 14) by implementing the computation to obtain the second control point D (Ls, Ls') or the like based on the dodging parameters obtained by the dodging parameter calculator 41, creates the conversion table i.e. the LUT concerning the gradation conversion characteristic, and sends the information relating to the created conversion table to the gradation converter 62 for setting (Step S304). Then, the gradation converter 62 performs a gradation conversion process based on the conversion table (Step S305), and the image data acquired by the gradation conversion process is stored in the image memory 181 (Step S306).

Fifth Embodiment

Figure 16:
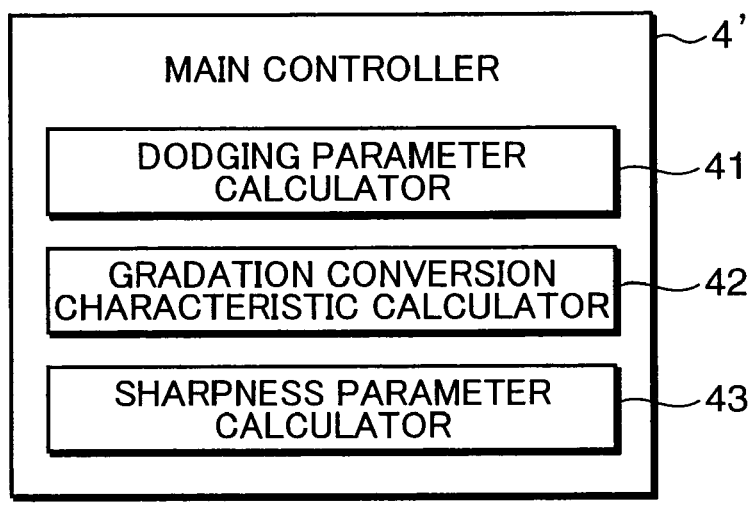
FIG. 16 is a functional block diagram of a controller in a digital camera according to a fifth embodiment of the invention.

The fourth embodiment describes the case that the gradation conversion process is controlled in accordance with the dodging parameters. The fifth embodiment describes a case that a sharpness correction process is performed by determining a parameter (hereinafter, also called as a "sharpness parameter") concerning sharpness correction e.g. a sharpness correction amount in accordance with a dodging parameter, in other words, a sharpness correction process is controlled in accordance with the dodging parameter. The block configuration of a digital camera in the fifth embodiment is substantially the same as that shown in FIG. 10 except that, as shown in FIG. 16, a main controller 4' corresponding to the main controller 4 in FIG. 10 is additionally provided with a sharpness parameter calculator 43.

The sharpness parameter calculator 43 is adapted to calculate a sharpness parameter in accordance with the area size in performing a local computation process with respect to each of the image areas, as described in the fourth embodiment, including a case that local contrast correction is performed as the local process. Similarly to the fourth embodiment, the area size includes the filter size and the block size to be used in dividing an image into plural blocks. In this embodiment, the filter size is used as the information relating to the area size. The sharpness parameter calculator 43 calculates a sharpness parameter in accordance with the filter size Sf of a filter to be used in extracting an illumination component, which has been calculated by the dodging parameter calculator 41. Specifically, the sharpness parameter calculator 43 modifies a predetermined sharpness correction level, (also defined as a "sharpness correction amount Sh"), which has been inputted through the user I/F 5, as shown in FIG. 18, in accordance with the filter size Sf, and switches i.e. selects a filter to be used in sharpness correction in accordance with the sharpness correction amount acquired by the modification.

Figure 17:
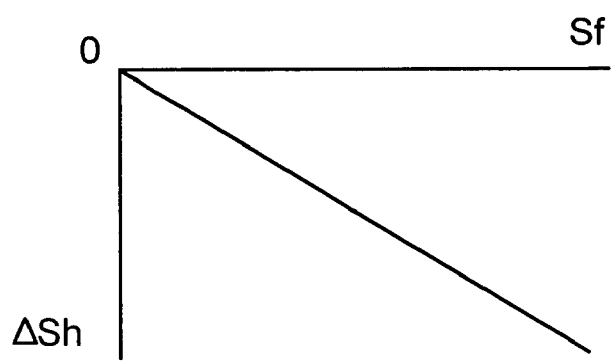
FIG. 17 is a graph showing a relation between a filter size Sf and a correction amount Δsh.

The modification concerning the sharpness correction amount Sh in accordance with the filter size Sf is executed by the following formula (14).

$$Sh'=Sh+\Delta Sh \qquad (14)$$

where Sh' is a value after modification of Sh, and ΔSh is a value i.e. a modification amount, which is given based on a relation of negative monotonic decrease versus increase of the filter size Sf, as shown in FIG. 17. Monotonic decrease includes any condition including linear decrease, as far as increase is not observed. In other words, as the value Sf increases from 0, the value ΔSh decreases from 0.

The sharpness parameter calculator 43 selects a high-pass filter for sharpness correction, which has a property that sharpness is increased in proportion to e.g. Sh' in the case where Sh' is a positive value; and selects a low-pass filter for sharpness correction, which has a property that smoothness is increased in inverse proportion to e.g. Sh', in the case where Sh' is a negative value, based on the information relating to Sh, which has been obtained by implementing the formula (14). In other words, the sharpness parameter calculator 43 changes a frequency characteristic for edge extraction to be used in a sharpness correction process by the sharpness corrector 63 in accordance with the sharpness correction amount Sh, which is determined based on the filter size Sf i.e. the area size based on which the local computation process is performed.

In the case where the value Sh' is 0 in the formula (14), the filter process for the sharpness correction is not executed. In other words, no filter is selected. The information relating to the filters such as the high-pass filter and the low-pass filter may be stored in advance in the sharpness parameter calculator 43 or a like device. The sharpness parameter calculator 43 sends the information relating to the selected filter to the sharpness corrector 63 for setting the information in the sharpness corrector 63. The sharpness corrector 63 executes the sharpness correction process based on the information relating to the set filter i.e. one of the high-pass filter and the low-pass filter. The sharpness correction amount Sh' and the filter selected based on the sharpness correction amount Sh' correspond to the sharpness parameter.

Figure 19:
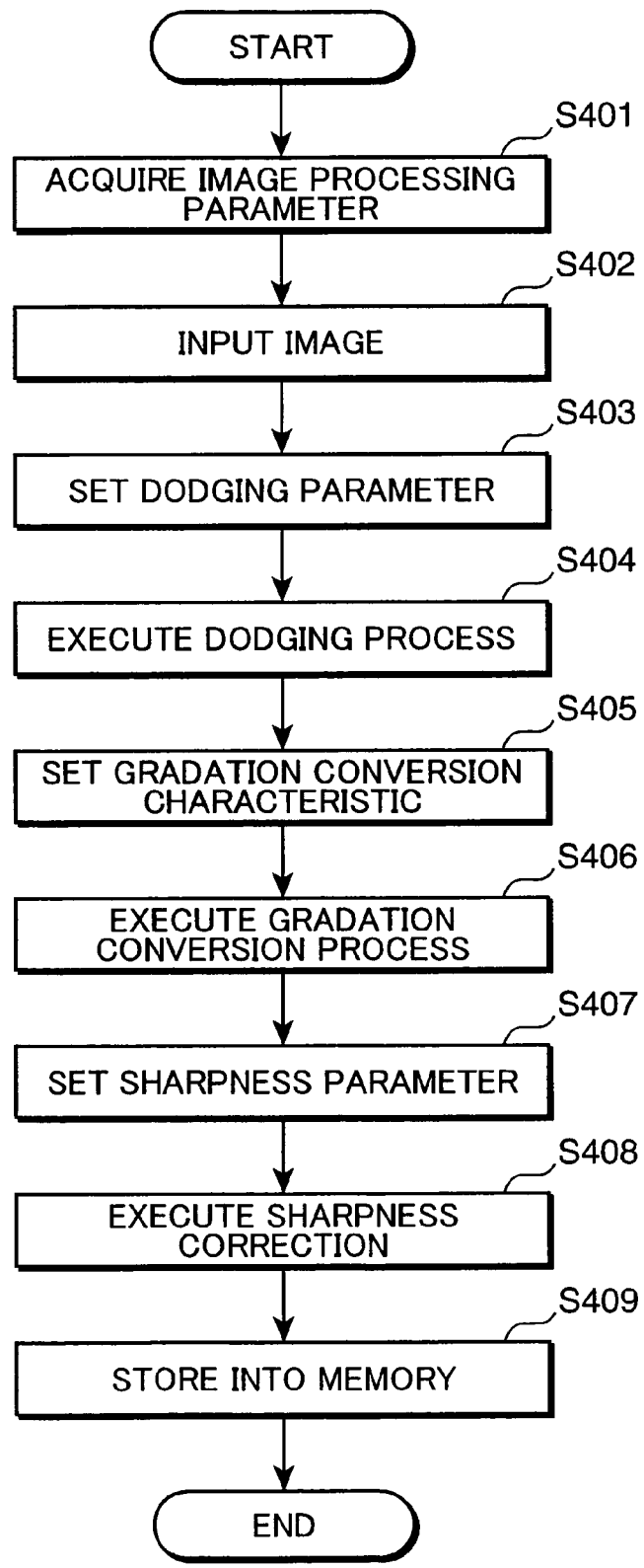
FIG. 19 is a flowchart showing an example of an operation concerning a sharpness correction process in accordance with a dodging parameter in the fifth embodiment.

FIG. 19 is a flowchart showing an example of an operation of the sharpness correction process to be executed in accordance with the dodging parameter in the fifth embodiment. First, the information relating to the sharpness correction amount Sh, which has been inputted by the user through the user I/F 5 is set in the sharpness parameter calculator 43 (Step S401). Then, in response to e.g. turning on of the release switch, the image sensor 162 is operative to acquire a sensed image to output sensed image data to the main controller 4' for storage into e.g. the image memory 181 (Step S402). Then, the dodging parameter calculator 41 of the main controller 4' sends, to the dodging processor 61, the dodging parameters, i.e. the information relating to the compression start level Ls and the upper limit value Lmax (see FIG. 3), as well as the information relating to the filter size Sf, for setting (Step S403). Then, the dodging processor 61 performs the dodging process, based on the set dodging parameters i.e. extracts the illumination component L from the original image I for dynamic range compression, and generates a new image I' based on the illumination component L' and the reflectance component R (Step S404).

Next, the gradation conversion characteristic calculator 42 of the main controller 4' calculates the gradation conversion characteristic (see FIGS. 4 and 5) by computation to obtain the second control point D (Ls, Ls') or the like, based on the dodging parameters obtained by the dodging parameter calculator 41, and creates the conversion table i.e. LUT concerning the gradation conversion characteristic. Then, the information relating to the created conversion table is sent to the gradation converter 62 for setting (Step S405). Then, the gradation converter 62 performs the gradation conversion process based on the conversion table (Step S406). Then, the sharpness parameter calculator 43 of the main controller 4' modifies the sharpness correction amount Sh inputted in Step S301 in accordance with the filter size Sf obtained by the dodging parameter calculator 41 (see the formula (14)).

Then, the filter to be used in sharpness correction is selected in accordance with the sharpness correction amount Sh' after the modification, and the selected filter is set in the sharpness corrector 63 (Step S407). Then, the sharpness corrector 63 performs the sharpness correction process based on the set filter (Step S408). The image data obtained by the sharpness correction process is stored into the image memory 181 (Step S409). The gradation conversion process in Steps S404 and S406 may not be necessarily executed in accordance with the dodging parameter. An ordinary well-known gradation conversion process using gamma may be executed, or a flow without the gradation conversion process, in which the routine proceeds directly from Step S404 to Step S407, may be executed. The order of implementing Steps S405, S406, S407, and S408 is not limited to the foregoing, but may be changed, for instance, in such a manner that Steps S405 and S406 are executed after Steps S407 and S408 are executed.

As mentioned above, the digital camera 1 or 1a recited in the first through the fifth embodiments, as an image sensing apparatus, includes: the image sensor 162, or the image sensor 162 and the imaging circuit 160, for sensing an image of a subject i.e. a subject light image, as an image sensing section; the photometry module 122, or the photometry module 122 and the main controller 150, or the main controller 4, for detecting a luminance of the subject, as a detector; the dynamic range compressor 504, or the dodging processor 61, for compressing a dynamic range of the subject image, as a compressor; and the main controller 150, or the main controller 4, for controlling a compression characteristic to be used in compressing the dynamic range based on a detection result of the detector, as a controller. This enables to control the compression characteristic to be used in compressing the dynamic range based on the subject luminance information detected by the detector. This is advantageous in obtaining a proper image without generation of an unnatural image, in which the contrast of the subject image in a high luminance area may be unduly lowered, or a high frequency component i.e. an edge component may be emphasized, without impairing the useful information included in the original image. In other words, a proper image i.e. a high-quality image can be obtained despite the dynamic range compression. The parameter for e.g. the dynamic range compression i.e. for controlling the compression characteristic is calculated based on the subject luminance information obtained in sensing the original image. This allows for high speed acquisition of the parameter to be used in the dynamic range compression.

The detector detects the luminance of the subject in a plurality of areas of the subject image e.g. the photometric sections A0, and A1 through A13. The controller controls the compression characteristic e.g. the compression characteristic curves CC1 and CC2 based on a maximal value of the detected subject luminances i.e. the maximal luminance Bvmax, and a minimal value of the detected subject luminances i.e. the minimal luminance Bvmin in the plurality of areas e.g. the photometric sections A1 through A13 i.e. based on the multi-area photometric data. This enables to facilitate control of the compression characteristic to be used in the dynamic range compression, based on the detected subject luminance information i.e. the maximal and minimal values of the subject luminance.

In the case where there exist a first difference value D1 (=Bvmax1−Bvmin1) and a second difference value D2 (=Bvmax2−Bvmin2) smaller than the first difference value, as a difference value between the maximal value and the minimal value, the controller controls the compression characteristic in such a manner that a compression ratio e.g. c2 set for the second difference value is larger than a compression ratio e.g. c1 set for the first difference value. This facilitates control of the compression characteristic to be used in the dynamic range compression, using the maximal and minimal values of the subject luminance.

The detector detects the luminance in at least two areas concerning the subject image e.g. a main subject area and a background area. The controller controls the compression characteristic based on a discrimination result as to whether one of the detected subject luminances i.e. the main subject luminance Bvmain and the background luminance Bvsub in the two areas is larger or smaller than the other one of the detected subject luminances. This facilitates control of the compression characteristic to be used in the dynamic range compression, based on the detected subject luminance information, in other words, at least two luminance values i.e. the main subject luminance and the background luminance concerning the subject luminance.

One of the two areas is the main subject area corresponding to a central area of the subject image e.g. the central area A7, and the other one of the two areas is the background area corresponding to an area other than the central area of the subject image e.g. the area other than the central area A7. The controller controls the compression characteristic in such a manner that a first compression ratio c1, a second compression ratio c3, and a third compression ratio c2 satisfy the relationship: c1<c2<c3, wherein the first compression ratio c1 is used in the case where a first different value (Bvmain−Bvsub) obtained by subtracting the background luminance in the background area from the main subject luminance in the main subject area is equal to or larger than zero, the second compression ratio c3 is used in the case where a second different value (Bvmain−Bvsub) obtained by subtracting the background luminance from the main subject luminance is equal to or smaller than a predetermined negative threshold value i.e. the backlit discrimination value TH, and the third compression ratio c2 is used in the case where a third difference value (Bvmain−Bvsub) obtained by subtracting the background luminance from the main subject luminance is smaller than zero and is larger than the threshold value. This facilitates control of the compression characteristic to be used in the dynamic range compression, using the luminance values in the at least two areas.

The image sensing section includes an image sensor i.e. the image sensor 162, which has a photoelectric conversion characteristic with a linear characteristic where an electric signal is linearly converted commensurate with an incident light amount for output, and a logarithmic characteristic where the electric signal is logarithmically converted commensurate with the incident light amount for output, and which is operative to obtain a linear-logarithmic image by a sensing operation thereof. With use of the image sensor, a wide dynamic range image can be easily obtained, which facilitates acquisition of a proper image with its compression characteristic to be used in the dynamic range compression being controlled based on the subject luminance information, using the wide dynamic range image.

The digital camera 1 may further comprise: a characteristic converter, i.e. the main controller 150 or the image processor 165, for converting the linear-logarithmic image into a linear image having the linear characteristic over the entirety of the photoelectric conversion characteristic; an image creator, i.e. the main controller 150 or the image processor 165, for creating, based on the linear image, a plurality of images having different contrasts in accordance with the detected luminance in each of a plurality of areas concerning the subject image; an image divider, i.e. the main controller 150 or the image processor 165, for dividing each of the plurality of images into a plurality of block images; and an image synthesizer, i.e. the main controller 150 or the image processor 165, for selecting the block image having a maximal contrast from the block images at positions corresponding to each other among the plurality of images with respect to each of the block images for synthesis of the selected block images. This enables to select a block image with a sufficiently high contrast with respect to each of the block images, thereby enabling to obtaining a proper image in which the high contrast block images are synthesized. A natural image with no or less incongruity between the block images can be obtained by executing the aforementioned blend process in synthesizing the block images, which enables to obtain a high-quality image.

Another aspect of the invention is directed to an image sensing method recited in the first through the fifth embodiments. The image sensing method comprises an image sensing step of sensing an image of a subject; a detecting step of detecting a luminance of the subject in a plurality of areas concerning the subject image; a calculating step of calculating a compression characteristic to be used in compressing a dynamic range of the subject image based on a detection result obtained in the detecting step; and a compressing step of compressing the dynamic range of the subject image using the compression characteristic. This enables to control the compression characteristic to be used in the dynamic range compression in the compressing step, based on the subject luminance information obtained in the detecting step. This is advantageous in obtaining a proper image without generation of an unnatural image, in which the contrast of the subject image in a high luminance area may be unduly lowered, or a high frequency component i.e. an edge portion may be emphasized, without impairing the useful information included in the original image. In other words, a proper image i.e. a high-quality image can be obtained despite the dynamic range compression.

The image sensing apparatus recited in the fourth embodiment i.e. the digital camera 1a is constructed in such a manner that the image input section 2 or the image sensor 162, as the image sensing section, obtains a subject image; the dodging processor 61, as a processor, performs a dodging process concerning the dynamic range compression with respect to the subject image; the dodging parameter calculator 41, as a parameter setter, sets the dodging parameter, as a first parameter, concerning the dodging process, to control the compression characteristic; the gradation converter 62, as a converter, performs a gradation conversion process with respect to the subject image; and the gradation conversion characteristic calculator 42, as a gradation characteristic setter, sets a gradation conversion characteristic concerning the gradation conversion process. The gradation conversion characteristic calculator 42 determines the gradation conversion characteristic based on the dodging parameter set by the dodging parameter calculator 41, and the gradation converter 62 performs the gradation conversion process based on the gradation conversion characteristic determined by the gradation conversion characteristic calculator 42.

In the above arrangement, the gradation conversion characteristic is determined based on the dodging parameter, and the gradation conversion process is performed based on the determined gradation conversion characteristic. This enables to obtain a proper gradation characteristic, considering a characteristic inherent to the dodging process without incurring contrast lowering in the high luminance area as a result of the gradation conversion. In other words, despite the dodging process i.e. the dynamic range compression, a proper image i.e. a high-quality image having a proper gradation characteristic, considering the dodging characteristic, can be obtained without incurring contrast lowering in the high luminance area as a result of the gradation conversion.

The dodging processor 61 performs the dodging process by compressing the illumination component L extracted from the original image I, and by generating the new image I' based on the compressed illumination component L' and the reflectance component R extracted from the original image, and the gradation conversion characteristic calculator 42 determines the gradation conversion characteristic 410 (420) based on the parameter representing a degree of compression in the luminance range where the illumination component L is to be compressed. This enables to determine the gradation conversion characteristic 410 (420), while properly considering the dodging characteristic.

The gradation conversion characteristic calculator 42 determines the gradation conversion characteristic 410 (420) based on information, as the dodging parameter, relating to a first luminance level corresponding to the predetermined compression start level Ls in the luminance range where the illumination component is to be compressed, and a second luminance level higher than the compression start level Ls. This facilitates determination of the gradation characteristic 410 (420), while properly considering the dodging characteristic, using the information relating to the first luminance level, which is set to a level value obtainable of proper brightness or proper contrast concerning e.g. the main subject, and the second luminance level higher than the first luminance level.

The first luminance level may be a luminance level equal to or larger than a main subject luminance corresponding to a predetermined luminance value of the main subject, i.e. the input value I0 in the gradation conversion shown in FIGS. 13 and 14. In the case where the first luminance level is defined as an input value Ls in the gradation conversion, the gradation conversion characteristic calculator 42 determines the gradation conversion characteristic 410 (420) in such a manner that an output value Ls' in the gradation conversion with respect to the gradation conversion input value Ls is set to a small value if the degree of compression of the illumination component L is large, and that the gradation conversion output value Ls' with respect to the gradation conversion input value Ls is set to a large value if the degree of compression of the illumination component L is small. Thus, proper gradation conversion considering the dodging characteristic can be executed in such a manner that: in the case where the degree of compression of the illumination component L is large, in other words, the luminance area for compression i.e. the dynamic range in the dodging process is wide, the gradation conversion output in the intermediate luminance area or the high luminance area is suppressed by setting the gradation conversion output to a low level (see the example shown in FIG. 14); and in the case where the degree of compression of the illumination component L is small, in other words, the luminance area for compression in the dodging process is narrow, a higher gradation conversion output is obtained in the intermediate luminance area or the high luminance area by setting the gradation conversion output to a high level (see the example shown in FIG. 13).

The gradation conversion characteristic calculator 42 may determine the gradation conversion characteristic 410 (420) capable of converting the gradation conversion input value 10 concerning the main subject luminance into a proper output value 10' in the gradation conversion, which is an output level obtainable of intended brightness concerning the main subject. This enables to prevent likelihood that the main subject image may be dark as a result of the gradation conversion, thereby enabling to perform more proper gradation conversion.

The image sensing apparatus recited in the fifth embodiment i.e. the digital camera 1a is constructed in such a manner that the image input section 2 or the image sensor 162, as the image sensing section, obtains the subject image; the dodging processor 61, as the processor, performs the dodging process concerning the dynamic range compression with respect to the subject image; the dodging parameter calculator 41, as a parameter setter, sets the dodging parameter, as a first parameter concerning the dodging process, to control the compression characteristic; the sharpness corrector 63 performs a sharpness correction process with respect to the subject image; and the sharpness parameter calculator 43, as a correction amount setter, sets a sharpness correction amount Sh concerning the sharpness correction process. The sharpness parameter calculator 43 determines the sharpness correction amount Sh based on the dodging parameter set by the dodging parameter setter 41, and the sharpness corrector 63 performs the sharpness correction process based on the sharpness correction amount Sh determined by the sharpness parameter calculator 43.

In the above arrangement, the sharpness correction amount Sh is determined based on the dodging parameter, and the sharpness correction process is performed based on the set sharpness correction amount Sh. This enables to obtain a proper sharpness characteristic, considering the dodging characteristic, without generation of an unnatural image, in which a high frequency component may be emphasized as a result of the dodging process. In other words, despite the dodging process i.e. the dynamic range compression, a proper image i.e. a high-quality image having a proper sharpness characteristic, considering the dodging characteristic, can be obtained without generation of an unnatural image, in which the high frequency component may be emphasized as a result of the dodging process.

The dodging process may be realized by performing a computation process locally with respect to a plurality of image areas obtained by dividing the subject image i.e. the original image I, and the dodging parameter may be a size i.e. the area size of each of the image areas to which the local computation process is to be performed. In this arrangement, since the area size to be used in the local computation process concerning the subject image is handled as the dodging parameter, various parameters such as the filter size to be used in performing a filter process with respect to the subject image, or the block size to be used in dividing the original image into a plurality of blocks, can be used as the dodging parameter. This enables to obtain a proper sharpness characteristic in accordance with the dodging parameter, considering these parameters.

The dodging parameter may be the filter size Sf of a filter i.e. the edge preserving filter for extracting the illumination component L from the original image. The sharpness parameter calculator 43 determines the sharpness correction amount Sh based on the filter size Sf (see the formula (5)). In this arrangement, since the sharpness correction amount is determined based on the filter size Sf, the sharpness correction amount can be easily determined, considering the dodging parameter, in performing the sharpness correction process in accordance with the dodging characteristic.

The dodging process may be realized by performing a contrast correction process locally with respect to a plurality of image areas obtained by dividing the subject image i.e. the original image I, and the dodging parameter may be a size of each of the image areas to which the local contrast correction process is to be performed. In this arrangement, since the area size to be used in the local contrast correction process with respect to the subject image is handled as the dodging parameter, a proper sharpness characteristic can be obtained in accordance with the dodging parameter, considering the local contrast correction process.

The sharpness parameter calculator 43 changes a frequency characteristic for edge extraction to be used by the sharpness corrector 63 in accordance with the sharpness correction amount determined based on the size of the each of the image areas to which the local computation process is to be performed. In this arrangement, the frequency characteristic for edge extraction to be used by the sharpness corrector 63 is changed in accordance with the sharpness correction amount determined based on the area size, in other words, the frequency characteristic for edge extraction in accordance with the sharpness correction amount is used. This enables to perform the sharpness correction based on the edge extraction more properly, considering the dodging characteristic.

The sharpness parameter calculator 43 may change an edge emphasis amount to be used by the sharpness corrector 63 in accordance with the sharpness correction amount determined based on the size of the each of the image areas to which the local computation process is to be performed. In this arrangement, the edge emphasis amount to be used by the sharpness corrector 63 is changed in accordance with the sharpness correction amount determined based on the area size, in other words, the edge emphasis amount in accordance with the sharpness correction amount is used. This enables to perform the sharpness correction based on the edge emphasis more properly, considering the dodging characteristic.

The image sensing section may include the image sensor 162 i.e. the linear-logarithmic sensor having the photoelectric conversion characteristic with the linear characteristic where an electric signal is linearly converted commensurate with an incident light amount for output, and the logarithmic characteristic where the electric signal is logarithmically converted commensurate with the incident light amount for output. In this arrangement, a wide dynamic range image can be easily obtained by a sensing operation of the image sensor 162. This is advantageous in easily obtaining an image, with its brightness or contrast in the main subject i.e. the low luminance area being secured, and its brightness or contrast in the high luminance area being properly adjusted, based on the wide dynamic range image, in performing the gradation conversion process based on the dodging parameter.

The arrangement recited in the fourth embodiment, in which the gradation conversion characteristic is determined based on the dodging parameter, and the gradation conversion process is performed based on the determined gradation conversion characteristic, and the arrangement recited in the fifth embodiment, in which the sharpness correction amount is determined based on the dodging parameter, and the sharpness correction process is performed based on the determined sharpness correction amount may be realized by the below-mentioned image processing method or image processing program.

Specifically, the image processing method includes: a dodging process performing step of performing a dodging process with respect to image data; a dodging parameter setting step of setting a dodging parameter concerning the dodging process; a gradation conversion characteristic determining step of determining a gradation conversion characteristic based on the set dodging parameter; and a gradation conversion process performing step of performing a gradation conversion process based on the determined gradation conversion characteristic.

The image processing program causes a computer to function as a dodging parameter setter for setting a dodging parameter concerning a dodging process with respect to image data, and a gradation conversion characteristic determiner for determining a gradation conversion characteristic based on the dodging parameter set by the dodging parameter setter.

With use of the image processing method or the image processing program as mentioned above, the gradation conversion characteristic is determined based on the dodging parameter, and the gradation conversion process is performed based on the determined gradation conversion characteristic. This enables to obtain a proper gradation characteristic, considering the dodging characteristic, without incurring contrast lowering in the high luminance area as a result of the gradation conversion.

The image processing method may include: a dodging process performing step of performing a dodging process with respect to image data; a dodging parameter setting step of setting a dodging parameter concerning the dodging process; a sharpness correction amount determining step of determining a sharpness correction amount based on the set dodging parameter; and a sharpness correction process performing step of performing a sharpness correction process based on the determined sharpness correction amount.

The image processing program may cause a computer to function as a dodging parameter setter for setting a dodging parameter concerning a dodging process with respect to image data, and a sharpness correction amount determiner for determining a sharpness correction amount based on the dodging parameter set by the dodging parameter setter.

With use of the image processing method or the image processing program as mentioned above, the sharpness correction amount is determined based on the dodging parameter, and the sharpness correction process is performed based on the determined sharpness correction amount. This enables to obtain a proper sharpness characteristic, considering the dodging characteristic, without generation of an unnatural image, in which a high frequency component may be emphasized as a result of the dodging process.

The following modifications and/or alterations may be applied to the invention.

(A) The dynamic range compression process and the compression characteristic control in the first through the fifth embodiment; and the gradation conversion process and the sharpness correction process in accordance with the dodging parameter as well as the dynamic range compression process and the compression characteristic control in the fourth and the fifth embodiment are executed by the parts provided in the image sensing apparatus i.e. the digital camera 1 or 1a. Alternatively, these processes may be executed by a predetermined information processor provided outside of the image sensing apparatus. Specifically, a predetermine host processor e.g. a PC (Personal Computer), or a computer-built-in device such as a PDA (Personal Digital Assistant) may execute the processes. The host processor is network-connected with the digital camera 1 or 1a by direct connection i.e. wired connection using a USB or a like device, or a wireless LAN, or a like device; or is provided with a user interface which is configured to transmit information, using a storage medium such as a memory card, or a like medium. The use of the information processor i.e. an external device externally connected to the digital camera 1 or 1a enables to perform a fine compression process of an illumination component, or a gradation conversion process or a sharpness correction process in accordance with a dodging parameter.

In the modification (A), the image sensing apparatus and the information processor may constitute an image sensing system. Specifically, the image sensing system comprises: an image sensing apparatus i.e. the digital camera 1 or 1a for sensing an image of a subject; and an information processor e.g. the PC for performing a predetermined computation process, wherein the image sensing apparatus and/or the information processor includes a detector for detecting a luminance of the subject, and the information processor includes a compressor for compressing a dynamic range of the subject image, and a controller for controlling a compression characteristic to be used in compressing the dynamic range based on a detection result of the detector. In the image sensing system having the above arrangement, the compression characteristic to be used in compressing the dynamic range can be controlled based on the subject luminance information detected by the detector. This enables to obtain a proper image without generation of an unnatural image, in which the contrast of the subject image in a high luminance area may be unduly lowered, or a high frequency component i.e. an edge component may be emphasized, without impairing the useful information included in the original image. In other words, a proper image i.e. a high-quality image can be obtained despite the dynamic range compression.

(B) In the fifth embodiment, the sharpness parameter is calculated by correcting the sharpness correction amount Sh in accordance with the filter size Sf of the filter for extracting an illumination component i.e. the area size. Alternatively, an outline emphasis amount i.e. an edge emphasis amount with respect to an image obtained by a coring process may be changed in accordance with the filter size Sf i.e. the area size. Specifically, the sharpness corrector 63 may include, as shown in FIG. 20 for instance, an outline emphasis processor 64. The outline emphasis processor 64 has a filter processor 641, an adder 642, a coring processor 643, an outline emphasis amount setter 644, a multiplier 645, and an adder 646 so that the outline emphasis amount setter 644 sets a gain i.e. an outline emphasis amount in accordance with the filter size Sf, and the multiplier 645 multiplies the gain by a coring result outputted from the coring processor 643 i.e. an edge image 654 to be described later for outline emphasis. In this modification, the outline emphasis amount is set to a value proportional to the filter size Sf.

The filter processor 641 performs a two-dimensional LPF (low-pass filter) process with respect to e.g. an input image 651 i.e. an original image, using a filter of symmetry type having M×N e.g. 5×5 in size, and outputs an LPF image 652 corresponding to a low frequency component. The adder 642 computes a difference between the input image 651 and the LPF image 652, and extracts a high frequency component i.e. a difference image 653 having an edge component and a noise component. The coring processor 643 performs a coring process i.e. a noise component removal process by removing a coring factor from the difference image 653 to output an edge image 654. The coring factor is a factor to be used in removing the noise component from the image signal for extraction of the edge component. The outline emphasis amount setter 644 sets an outline emphasis amount in accordance with the filter size Sf calculated by the dodging parameter calculator 41. The multiplier 645 multiplies the edge image 654 by the outline emphasis amount set by the outline emphasis amount setter 644, and outputs an edge emphasis image 655. In this modification, the outline emphasis amount is set to about 6. The adder 646 multiplies the edge emphasis image 655 by the LPF image 652 outputted from the filter processor 641 for synthesis, and outputs an output image 656. Thus, the outline emphasis processor 64 is operative to generate the output image 656, in which the noise component is removed from the input image 651, and the edge component is emphasized.

Although the invention has been appropriately and fully described by way of examples with reference to the accompanying drawings, it is to be understood that various changes and/or modifications will be apparent to those skilled in the art. Therefore, unless otherwise such changes and/or modifications depart from the scope of the present invention hereinafter defined, they should be construed as being included therein.

What is claimed is:

1. An image sensing apparatus comprising:
an image sensing section for sensing an image of a subject;
a detector for detecting a luminance of the subject;
a compressor for compressing a dynamic range of the subject image; and
a controller for controlling a compression characteristic to be used in compressing the dynamic range based on a detection result of the detector, wherein
the detector detects the luminance in a plurality of areas concerning the subject image,
the controller controls the compression characteristic based on a maximal value and a minimal value of the detected luminance in the plurality of areas, and
in the case where there exist a first difference value and a second difference value smaller than the first difference value, as a difference value between the maximal value and the minimal value, the controller controls the compression characteristic in such a manner that a compression ratio set for the second difference value is larger than a compression ratio set for the first difference value.

2. The image sensing apparatus according to claim 1, wherein
the image sensing section includes an image sensor having a photoelectric conversion characteristic with a linear characteristic where an electric signal is linearly converted commensurate with an incident light amount for output, and a logarithmic characteristic where the electric signal is logarithmically converted commensurate with the incident light amount for output, the image sensor being operative to obtain a linear-logarithmic image by a sensing operation thereof.

3. An image sensing apparatus comprising:
an image sensing section for sensing an image of a subject;
a detector for detecting a luminance of the subject;
a compressor for compressing a dynamic range of the subject image; and
a controller for controlling a compression characteristic to be used in compressing the dynamic range based on a detection result of the detector,
wherein the detector detects the luminance in at least two areas concerning the subject image,
the one of the two areas is a main subject area corresponding to a central area of the subject image, and the other one of the two areas is a background area corresponding to an area other than the central area of the subject image, and
the controller controls the compression characteristic in such a manner that a first compression ratio, a second compression ratio, and a third compression ratio satisfy the following relationship:
the first compression ratio is less than the third compression ratio, and the third compression ratio is less than the second compression ratio,
the first compression ratio being used in the case where a first different value obtained by subtracting a background luminance in the background area from a main subject luminance in the main subject area is equal to or larger than zero,
the second compression ratio being used in the case where a second different value obtained by subtracting the background luminance from the main subject luminance is equal to or smaller than a predetermined negative threshold value, and
the third compression ratio being used in the case where a third difference value obtained by subtracting the background luminance from the main subject luminance is smaller than zero and is larger than the threshold value.

4. The image sensing apparatus according to claim 3, wherein
the image sensing section includes an image sensor having a photoelectric conversion characteristic with a linear characteristic where an electric signal is linearly converted commensurate with an incident light amount for output, and a logarithmic characteristic where the electric signal is logarithmically converted commensurate with the incident light amount for output, the image sensor being operative to obtain a linear-logarithmic image by a sensing operation thereof.

5. An image sensing apparatus comprising:
an image sensing section for sensing an image of a subject;
a detector for detecting a luminance of the subject;
a compressor for compressing a dynamic range of the subject image;
a controller for controlling a compression characteristic to be used in compressing the dynamic range based on a detection result of the detector;

a characteristic converter for converting the linear-logarithmic image into a linear image having the linear characteristic over the entirety of the photoelectric conversion characteristic;

an image creator for creating, based on the linear image, a plurality of images having different contrasts in accordance with the detected luminance in each of a plurality of areas concerning the subject image;

an image divider for dividing the each of the plurality of images into a plurality of block images; and an image synthesizer for selecting the block image having a maximal contrast from the block images at positions corresponding to each other among the plurality of images with respect to each of the block images for synthesis of the selected block images, wherein the image sensing section includes an image sensor having a photoelectric conversion characteristic with a linear characteristic where an electric signal is linearly converted commensurate with an incident light amount for output, and a logarithmic characteristic where the electric signal is logarithmically converted commensurate with the incident light amount for output, the image sensor being operative to obtain a linear-logarithmic image by a sensing operation thereof.

* * * * *